United States Patent
Saito et al.

(10) Patent No.: US 10,339,967 B2
(45) Date of Patent: Jul. 2, 2019

(54) REPRODUCING APPARATUS AND REPRODUCING METHOD

(71) Applicant: SONY CORPORATION, Tokyo (JP)

(72) Inventors: Kimihiro Saito, Saitama (JP);
Toshihiro Horigome, Kanagawa (JP);
Koji Sekiguchi, Kanagawa (JP);
Kotaro Kurokawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/077,632

(22) PCT Filed: Jan. 27, 2017

(86) PCT No.: PCT/JP2017/002958
§ 371 (c)(1),
(2) Date: Aug. 13, 2018

(87) PCT Pub. No.: WO2017/187688
PCT Pub. Date: Nov. 2, 2017

(65) Prior Publication Data
US 2019/0035425 A1    Jan. 31, 2019

(30) Foreign Application Priority Data

Apr. 28, 2016 (JP) .................................. 2016-090125

(51) Int. Cl.
*G11B 7/135* (2012.01)
*G11B 7/005* (2006.01)
(Continued)

(52) U.S. Cl.
CPC ............ *G11B 7/0053* (2013.01); *G11B 7/005* (2013.01); *G11B 7/00718* (2013.01); *G11B 7/135* (2013.01); *G11B 20/10009* (2013.01)

(58) Field of Classification Search
None
See application file for complete search history.

(56) References Cited

U.S. PATENT DOCUMENTS

| | | | | |
|---|---|---|---|---|
| 5,625,613 A | * | 4/1997 | Kato ................... | G11B 7/005 369/112.15 |
| 7,778,145 B2 | * | 8/2010 | Horie ................ | G11B 7/24079 369/275.1 |

(Continued)

FOREIGN PATENT DOCUMENTS

| EP | 3252772 A1 | 12/2017 |
|---|---|---|
| JP | 4564948 B2 | 10/2010 |

(Continued)

OTHER PUBLICATIONS

Mar. 22, 2019, European Search Report issued for related EP application No. 17788978.9.

*Primary Examiner* — Peter Vincent Agustin
(74) *Attorney, Agent, or Firm* — Paratus Law Group, PLLC

(57) ABSTRACT

Provided is a reproducing apparatus including: a reproduction signal generating circuit that calculates a first difference signal which is a difference between a first light receiving signal obtained by the first light receiving element and a second light receiving signal obtained by the second light receiving element, and a second difference signal which is a difference between a third light receiving signal obtained by the third light receiving element and a fourth light receiving signal obtained by the fourth light receiving element, and uses the first difference signal, the second difference signal, a phase difference between a crosstalk component and an average phase of the signal light beam, and an optical path length difference between the signal light beam and the reference light beam to obtain a reproduction signal; and a phase extraction circuit that obtains a successive change amount and updates with a successive variation.

12 Claims, 18 Drawing Sheets

(51) Int. Cl.
    *G11B 20/10*     (2006.01)
    *G11B 7/007*     (2006.01)

(56) References Cited

U.S. PATENT DOCUMENTS

| | | | | |
|---|---|---|---|---|
| 2005/0094536 | A1* | 5/2005 | Kimura | G11B 7/1275 |
| | | | | 369/112.05 |
| 2006/0092821 | A1* | 5/2006 | Tsukagoshi | G11B 7/00736 |
| | | | | 369/275.1 |
| 2007/0223932 | A1* | 9/2007 | Hsieh | G02B 27/283 |
| | | | | 398/152 |
| 2008/0023447 | A1* | 1/2008 | Holmgren | B23K 26/04 |
| | | | | 219/121.6 |
| 2010/0039917 | A1* | 2/2010 | Ide | G11B 7/005 |
| | | | | 369/100 |
| 2011/0078711 | A1* | 3/2011 | Komma | G11B 7/24038 |
| | | | | 720/695 |
| 2019/0035425 | A1* | 1/2019 | Saito | G11B 7/0053 |

FOREIGN PATENT DOCUMENTS

| | | |
|---|---|---|
| JP | 2013-054801 A | 3/2013 |
| JP | 2014-032728 A | 2/2014 |
| JP | 2015-028823 A | 2/2015 |
| WO | WO 2013/031120 A1 | 3/2013 |

\* cited by examiner

FIG. 2
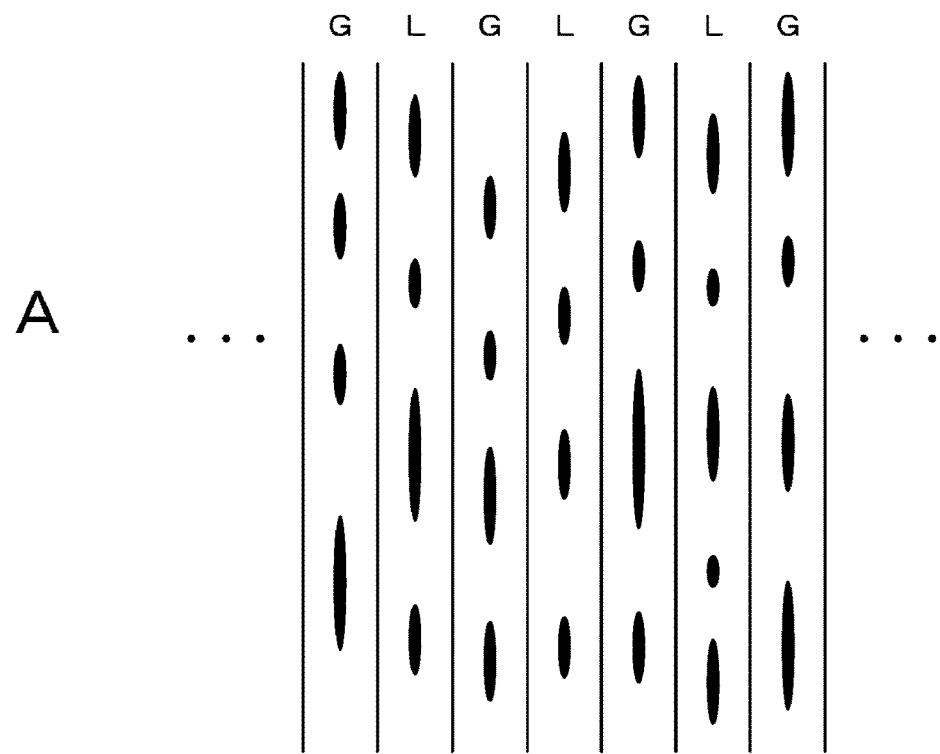
A
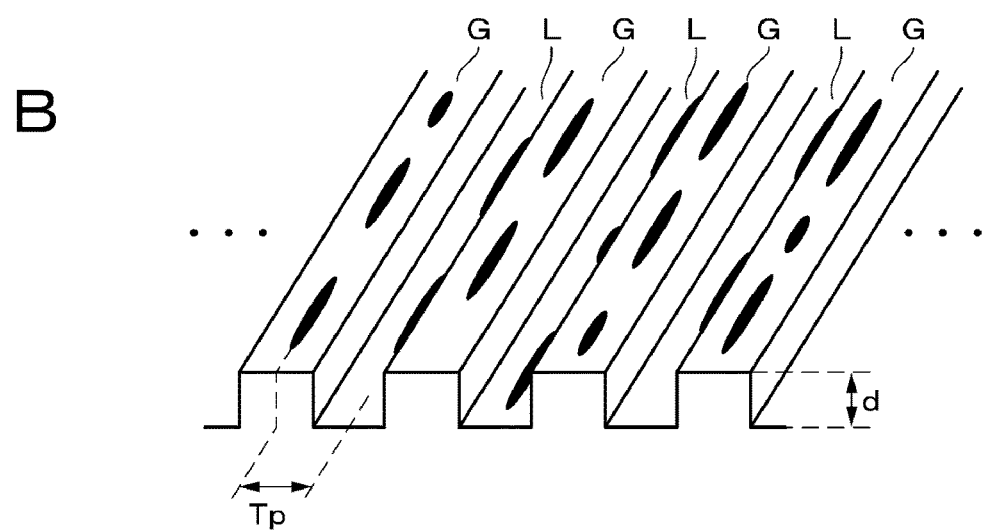
B

▨ PORTION: WHEN PHASE $\phi = 0$,

▨ PORTION: PHASE $\psi = 4\pi nd/\lambda$

FIG. 8
A
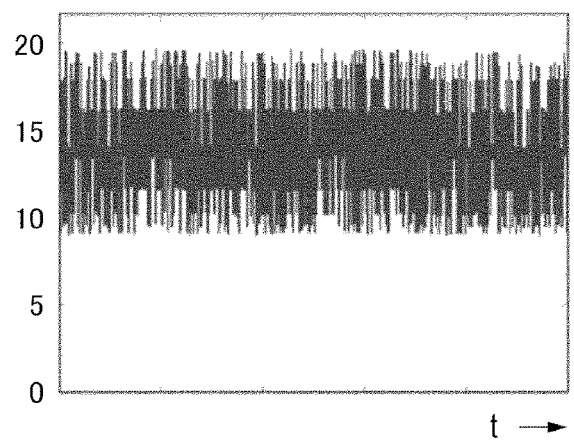
B
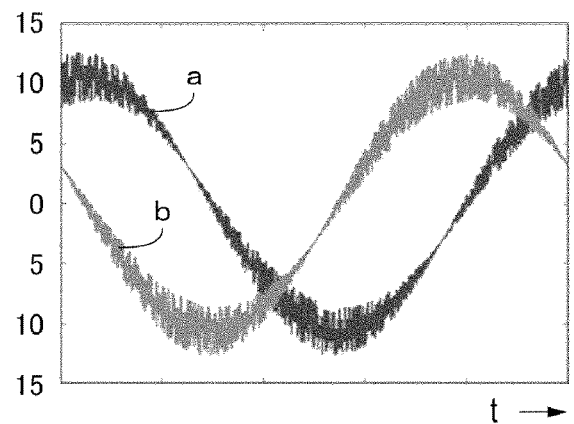
C
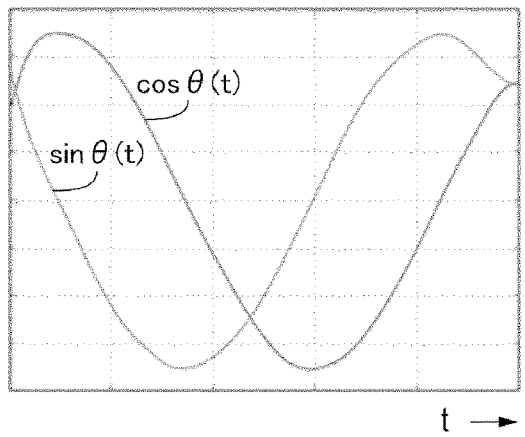

FIG. 9
A
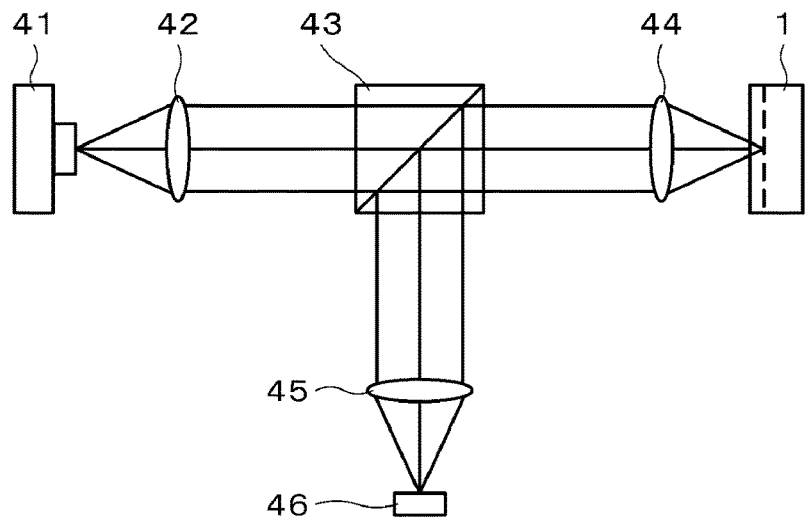
B
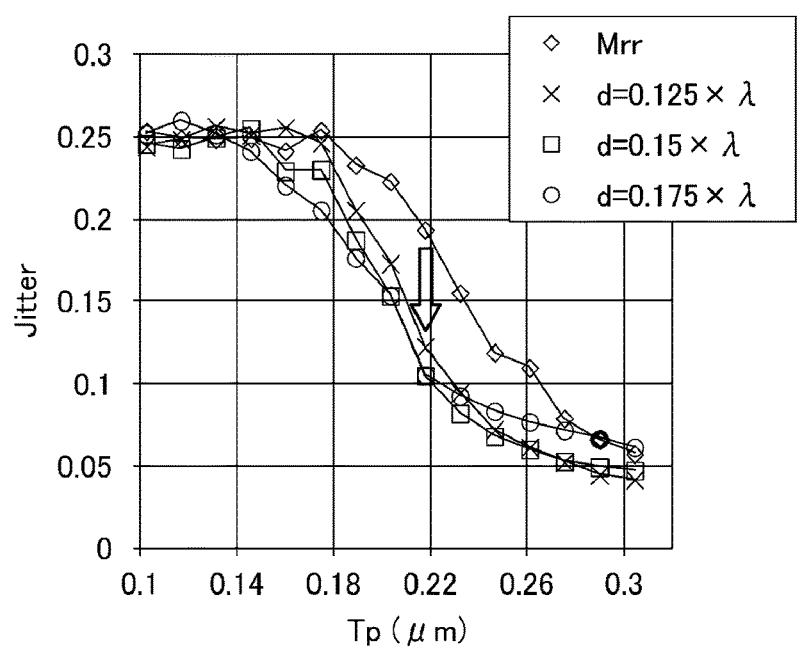

FIG. 10
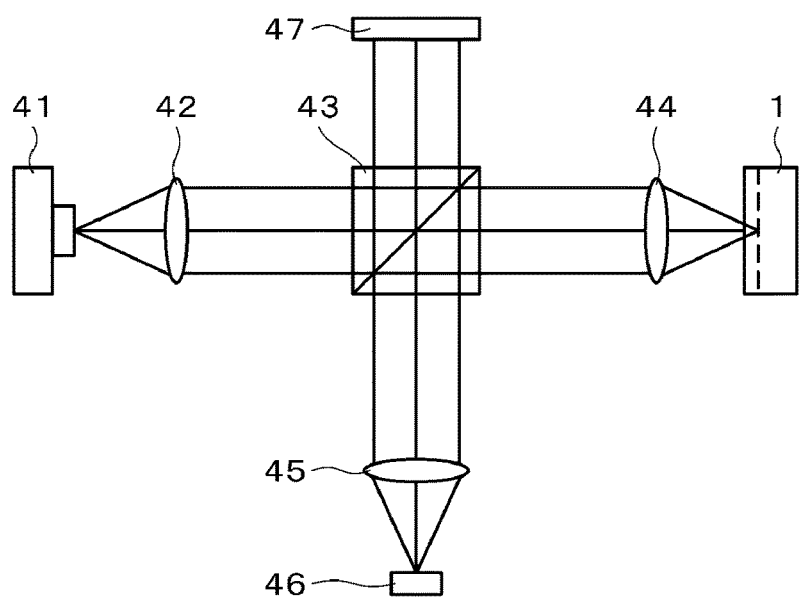
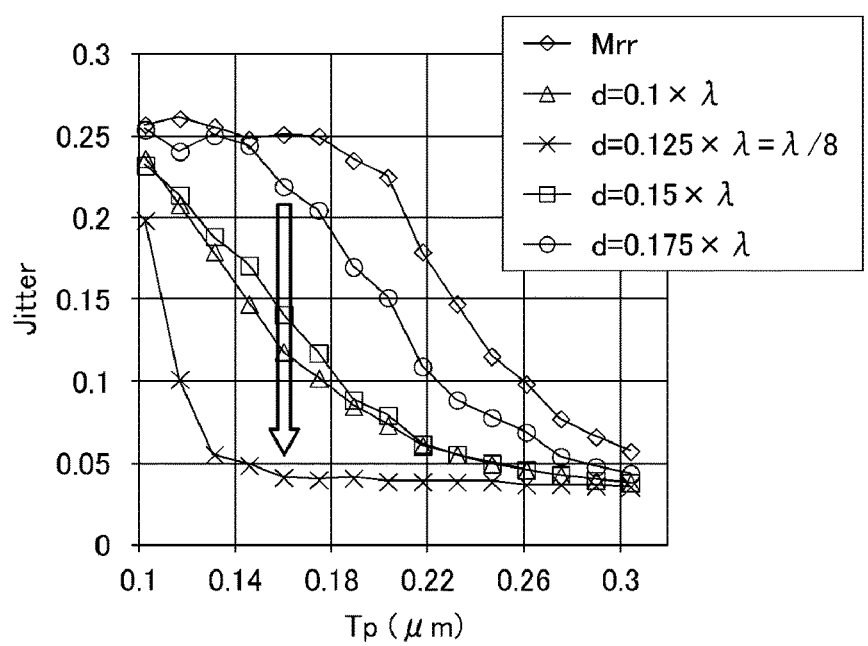

FIG. 15
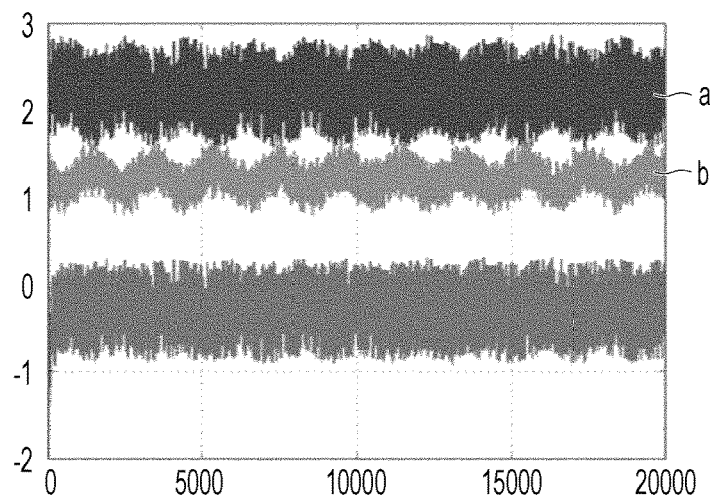
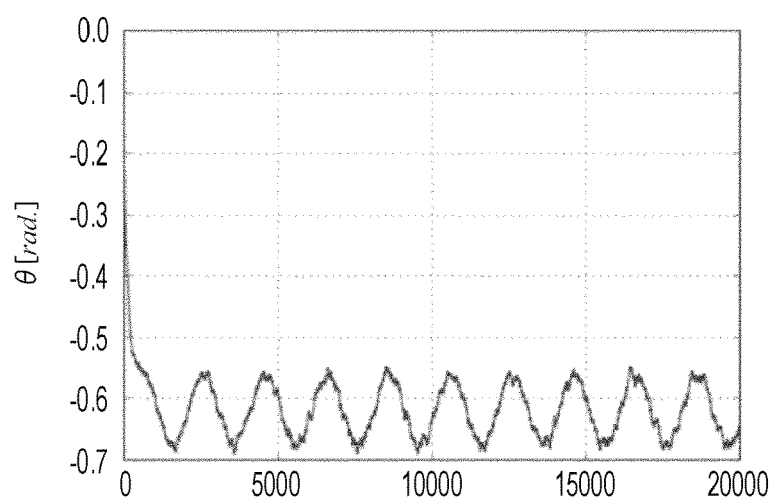
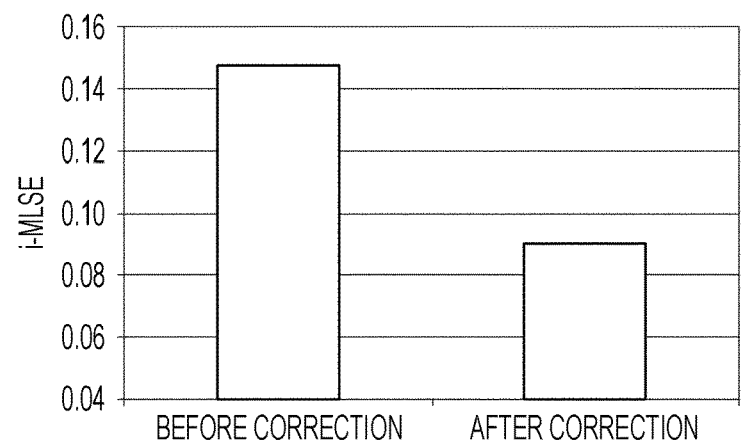

REPRODUCING APPARATUS AND REPRODUCING METHOD

CROSS REFERENCE TO PRIOR APPLICATION

This application is a National Stage Patent Application of PCT International Patent Application No. PCT/JP2017/002958 (filed on Jan. 27, 2017) under 35 U.S.C. § 371, which claims priority to Japanese Patent Application No. 2016-090125 (filed on Apr. 28, 2016), which are all hereby incorporated by reference in their entirety.

TECHNICAL FIELD

The present technology relates to a reproducing apparatus and a reproducing method applied to reproduce an optical medium such as an optical disk.

BACKGROUND ART

For example, when reproducing a multilayered optical disc, the signal light intensity decreases, and there is a high possibility that an error occurs in signal reading. In order to solve this problem, a homodyne detection method of amplifying a detection signal by using light interference is known (see Patent Document 1).

In Patent Document 1, as a homodyne system for detecting a light beam in which a signal light beam and a reference light beam are made to interfere with each other, it is necessary to perform detection on sets of four signal light beams and reference light beams whose phase differences are different by 90 degrees, respectively. Specifically, detection is performed on the sets of signal light beams and reference light beams whose phase differences are set to 0 degrees, 90 degrees, 180 degrees, and 270 degrees, respectively. Each of these detections is performed by detecting the light intensity of the light beam in which the signal light beam and the reference light beam are made to interfere with each other.

Further, Patent Document 2 describes signal processing for correctly reproducing a signal even when a light receiving element and an amplifier are AC-coupled. Further, Patent Document 3 describes a reproducing apparatus that applies a homodyne system to an optical disk in which signals are each recorded on a land and a groove.

In the homodyne system, the component of the signal light beam amplified according to the light intensity of the reference light beam can be obtained as a reproduction signal. By amplifying the signal light beam in this way, a signal to noise ratio (SNR) of the reproduction signal can be improved. Furthermore, the obtained reproduction signal is not influenced by the phase difference between the signal light beam and the reference light beam, so that an optical path length difference adjustment (so-called optical path length servo) can be made unnecessary.

CITATION LIST

Patent Document

Patent Document 1: Japanese Patent No. 4564948
Patent Document 2: Japanese Patent Application Laid-Open No. 2013-54801 A
Patent Document 3: Japanese Patent Application Laid-Open No. 2014-32728 A

SUMMARY OF THE INVENTION

Problems to be Solved by the Invention

Since the amplitude of a DC component is very large with respect to an AC component, considering the dynamic range of the amplifier, Patent Document 2 solves the problem that it is impossible to effectively increase an amplification factor of the AC component that is desired to be detected truly. In Patent Document 2, the AC component alone can be amplified by AC-coupling.

In Patent Document 3, the components of $\sin\theta$ and $\cos\theta$ are extracted from a signal obtained by a low pass filter, and a phase offset $\theta$ of the reference light beam is extracted using these values. However, the method using the low pass filter has a problem that a desired improvement effect cannot be obtained due to a reason that a noise enters a band of the reproduction signal because a noise band is wide.

Accordingly, the purpose of the present technology is to adopt a homodyne detection method and to provide a reproducing apparatus and a reproducing method capable of accurately extracting a phase offset.

Solutions to Problems

The present technology is a reproducing apparatus including:

an optical system that irradiates a recording medium on which signals are each recorded on a land and a groove with a light beam emitted from a light source to obtain a signal light beam reflecting each of the recording signals of the land and the groove, generates a reference light beam from the light beam emitted from the light source, and generates a set of a first signal light beam and a first reference light beam which give a phase difference of approximately 0° to a superimposed light beam obtained by superimposing the signal light beam and the reference light beam, a set of a second signal light beam and a second reference light beam which give a phase difference of approximately 180° to the superimposed light beam, a set of a third signal light beam and a third reference light beam which give a phase difference of approximately 90° to the superimposed light beam, and a set of a fourth signal light beam and a fourth reference light beam which give a phase difference of approximately 270° to the superimposed light beam;

a light receiving unit that uses a first light receiving element to receive the set of the first light beam and the first reference light beam, a second light receiving element to receive the set of the second signal light beam and the second reference light beam, a third light receiving element to receive the set of the third signal light beam and the third reference light beam, and a fourth light receiving element to receive the set of the fourth signal light beam and the fourth reference light beam;

a reproduction signal generating circuit that calculates a first difference signal a which is a difference between a first light receiving signal obtained by the first light receiving element and a second light receiving signal obtained by the second light receiving element, and a second difference signal b which is a difference between a third light receiving signal obtained by the third light receiving element and a fourth light receiving signal obtained by the fourth light receiving element, and uses the first difference signal a, the second difference signal b, a phase difference $\Psi$ between a crosstalk component and an average phase of the signal light beam, and an optical path length difference θ between the signal light beam and the reference light beam to carry out an arithmetic operation of $$a \cdot \sin(\Psi - \theta(t)) - b \cdot \cos(\Psi - \theta(t))$$

to obtain a reproduction signal; and a phase extraction circuit that obtains a successive change amount Δθ of θ and updates θ with the successive variation Δθ.

The present technology is a reproducing method including:

irradiating a recording medium on which signals are each recorded on a land and a groove with a light beam emitted from a light source to obtain a signal light beam reflecting each of the recording signals of the land and the groove, generating a reference light beam from the light beam emitted from the light source, and generating, by an optical system, a set of a first signal light beam and a first reference light beam which give a phase difference of approximately 0° to a superimposed light beam obtained by superimposing the signal light beam and the reference light beam, a set of a second signal light beam and a second reference light beam which give a phase difference of approximately 180° to the superimposed light beam, a set of a third signal light beam and a third reference light beam which give a phase difference of approximately 90° to the superimposed light beam, and a set of a fourth signal light beam and a fourth reference light beam which give a phase difference of approximately 270° to the superimposed light beam;

using a first light receiving element to receive the set of the first light beam and the first reference light beam, a second light receiving element to receive the set of the second signal light beam and the second reference light beam, a third light receiving element to receive the set of the third signal light beam and the third reference light beam, and a fourth light receiving element to receive the set of the fourth signal light beam and the fourth reference light beam;

calculating a first difference signal a which is a difference between a first light receiving signal obtained by the first light receiving element and a second light receiving signal obtained by the second light receiving element, and a second difference signal b which is a difference between a third light receiving signal obtained by the third light receiving element and a fourth light receiving signal obtained by the fourth light receiving element, and using the first difference signal a, the second difference signal b, a phase difference Ψ between a crosstalk component and an average phase of the signal light beam, and an optical path length difference θ between the signal light beam and the reference light beam to carry out an arithmetic operation of $$a \cdot \sin(\Psi - \theta(t)) - b^* \cos(\Psi - \theta(t))$$

to obtain a reproduction signal; and obtaining a successive change amount Δθ of θ and updating θ with the successive variation Δθ.

Effects of the Invention

According to at least one embodiment, a land/groove recording type optical recording medium can be satisfactorily reproduced by using a homodyne detection method. In the present technology, compared to the method of finding a phase θ of the reference light beam through the low pass filter of the difference signal, a signal with high responsiveness and stable for a long time is obtained. Note that the effects of the present technology described herein are not necessarily limited but may include any effect described in the present technology.

BRIEF DESCRIPTION OF THE DRAWINGS

FIG. 2 is an explanatory diagram of a structure of a recording surface of the optical recording medium to be reproduced.

FIG. 8 is a schematic diagram for explaining a phase diversity method.

FIG. 9 is a schematic diagram illustrating an optical system of a simulation and a graph illustrating a result obtained by a simulation of a relationship between a track pitch and a jitter when a step between the land and the groove are set to different values, respectively.

FIG. 10 is a schematic diagram illustrating an optical system of a simulation and a graph illustrating a result obtained by a simulation of a relationship between a track pitch and a jitter when a step between the land and the groove are set to different values, respectively.

FIG. 15 is a graph used for explaining the phase extraction circuit.

MODE FOR CARRYING OUT THE INVENTION

The embodiments described below are specific favorable examples of the present technology and a variety of technologically preferable limitations is given thereto. However, the scope of the present technology is not limited to these embodiments unless, in particular, the description that limits the present technology is described in the following description.

Note that the description of the present technology is done in the following order.
<1. Conventional homodyne detection method>
<2. Improved homodyne detection method>
<3. One embodiment>
<4. Example of photoelectric conversion circuit>
<5. Modified Example>

1. Conventional Homodyne Detection Method

Prior to the description of the reproducing method of one embodiment of the present technology, a conventional homodyne detection method and an improved homodyne detection method will be described. Hereinafter, as an example, a homodyne detection method based on a so-called phase diversity method will be described.

"Optical Recording Medium to be Reproduced"

Figure 1:
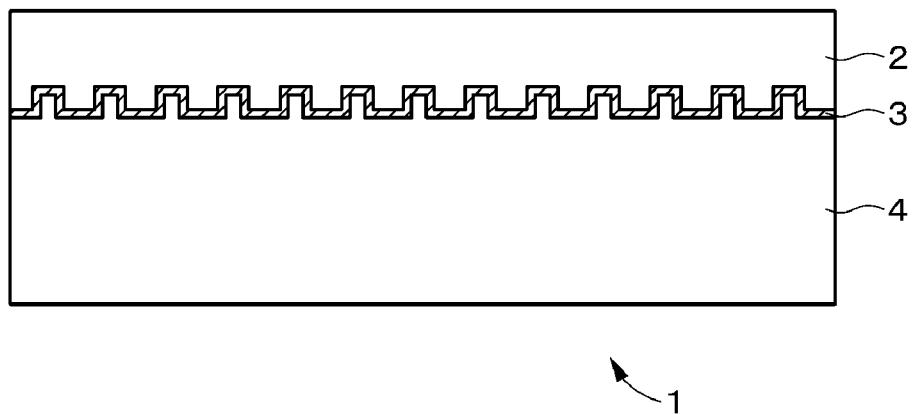
FIG. 1 is an explanatory diagram of a cross-sectional structure of an optical recording medium to be reproduced.

FIG. 1 illustrates a cross-sectional structural view of an optical recording medium 1 to be reproduced. The optical recording medium 1 which is rotationally driven is irradiated with a laser beam to reproduce a recording signal. The optical recording medium 1 is a so-called write-once type optical recording medium in which information is recorded by forming, for example, a recording mark.

As illustrated in FIG. 1, in the optical recording medium 1, a cover layer 2, a recording layer (reflecting film) 3, and a substrate 4 are formed in order from an upper layer side. Here, the "upper layer side" refers to the upper layer side when a surface on which the laser beam from a reproducing apparatus side is incident is an upper surface. That is, in this case, the laser beam is incident on the optical recording medium 1 from a cover layer 2 side.

In the optical recording medium 1, the substrate 4 includes a resin such as for example, polycarbonate, and an uneven sectional shape is given on the upper surface side. The substrate 4 is generated by for example, injection molding using a stamper or the like.

Then, the recording layer 3 is formed on the upper surface side of the substrate 4 given the uneven shape by sputtering or the like. Here, the track of the optical recording medium 1 to be reproduced by the conventional homodyne detection is formed with a normal track pitch not exceeding an optical limit value. In other words, the track pitch in the recording layer 3 is set to be larger than the optical limit value whose theoretical value is represented by "$\lambda/\text{NA}/2$" ($\lambda$ is a reproduction wavelength and NA is a numerical aperture of an objective lens).

The cover layer 2 formed on the upper layer side of the recording layer 3 is formed by, for example, applying an ultraviolet curing resin by a spin coating method or the like and then performing a curing treatment by ultraviolet irradiation. The cover layer 2 is provided for protecting the recording layer 3.

FIG. 2 illustrates a structure of a recording surface of the optical recording medium 1 to be reproduced. FIG. 2A is a plan view enlarging a part of the recording surface, and FIG. 2B is a partially enlarged perspective view of the recording surface. Note that FIG. 2B illustrates a surface on the side irradiated with a laser beam for reproduction. In other words, a laser beam for reproduction is applied from the upper side of the drawing. In the optical recording medium 1, grooves G and lands L are formed. Here, in this specification, similarly to a case of BD (Blu-ray Disc: registered trademark), a side on which the laser beam for reproduction first comes, that is, a side of a projecting portion is referred to as the groove G, and a side of a recessed portion is referred to as the land L.

In the optical recording medium 1 to be reproduced, a mark row is formed in each of the groove G and the land L. Assuming that the mark row is a track, a track pitch Tp can be defined as a formation pitch of the land L and the groove G as illustrated in FIG. 2B. By setting the track pitch Tp to a narrow pitch exceeding the optical limit value, information recording density is improved. For example, assuming that the formation pitch of the grooves G in the optical recording medium 1 is the same as the track pitch (formation pitch of mark rows) in the conventional optical recording medium, the information recording density of the optical recording medium 1 is increased to nearly twice the conventional information recording density.

A step (appropriately referred to as a depth) between the land L and the groove G is represented by d. For example, in a case where a refractive index of the optical recording medium 1 is n, the depth d is set to "$\lambda/8/n$". For example, if the reproduction wavelength $\lambda=405$ nm and n=1.5, a depth d of about 33 nm is formed.

Figure 3:
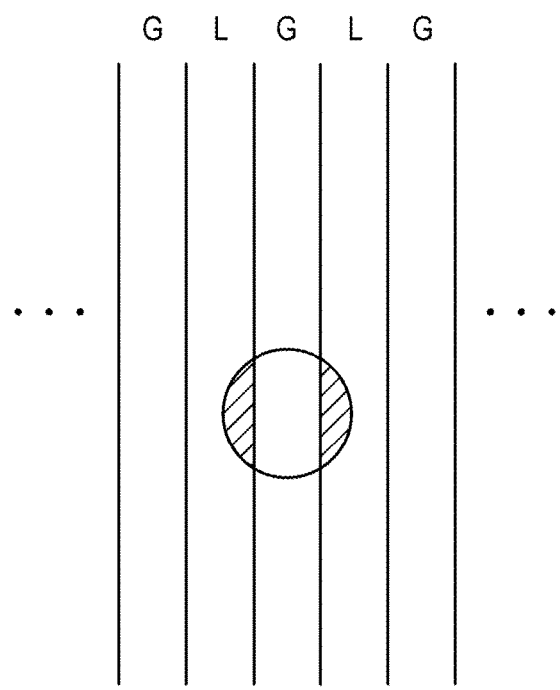
FIG. 3 is a schematic diagram illustrating a relationship between a beam spot of a reproduction light beam formed on the recording surface and a land and a groove.

Here, in the optical recording medium 1, since the formation pitch between the land L and the groove G exceeds the optical limit value, a relationship between a beam spot of a reproduction light beam formed on the recording surface and the land L and the groove G is as illustrated in FIG. 3, for example.

It is assumed that a tracking servo control of the objective lens is performed on the groove G or the land L as in the conventional case. FIG. 3 exemplifies a case where the tracking servo control of the objective lens is performed on the groove G as a target. In this case, it is found that the recorded information of two adjacent lands L coexists with the reproduction signal of the groove G, the reproduction signal being a servo target.

Figure 4:
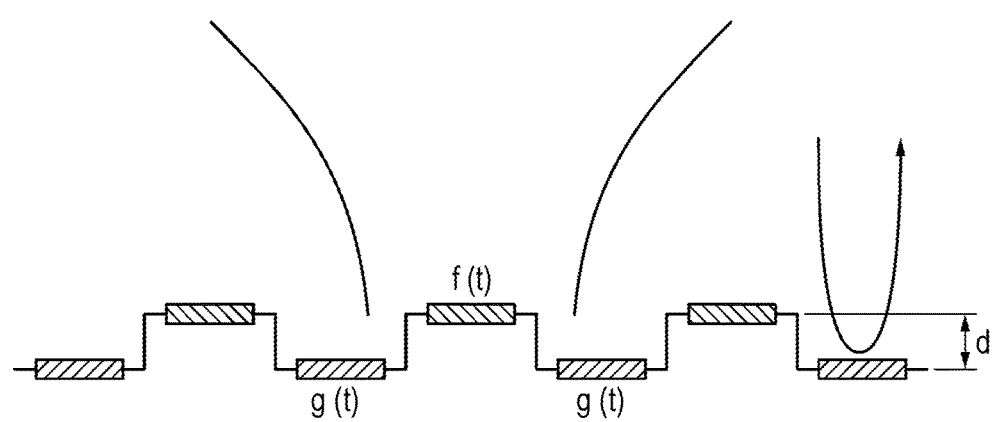
FIG. 4 is a schematic diagram used for explaining a reproduction state of the optical recording medium.

In other words, in a land/groove recording method, when the track pitch narrows, crosstalk occurs from the adjacent track. As illustrated in FIG. 4, when the groove is reproduced, not only a reproduction signal f(t) of the groove but also a reproduction signal g(t) of the adjacent land are mixed. When a phase $\phi$ of the groove reproduction signal is equal to 0, the land phase $\Psi$ is equal to $4\pi nd/\lambda$ ($\lambda$ is a wavelength and n is a refractive index of the substrate of the optical recording medium 1).

"Homodyne Detection Method by Phase Diversity Method"

In the phase diversity method, sets of four signal light beams and reference light beams which are made such that their phase differences differ by 90 degrees, respectively, are used. Specifically, in the phase diversity method, detection is performed on the sets of the signal light beams and the reference light beams adjusted so that the phase differences are approximately 0 degree, approximately 180 degrees, approximately 90 degrees, and approximately 270 degrees, respectively. Each of these detections is performed by detecting the light intensity of the light beam in which the signal light beam and the reference light beam are made to interfere with each other.

Figure 5:
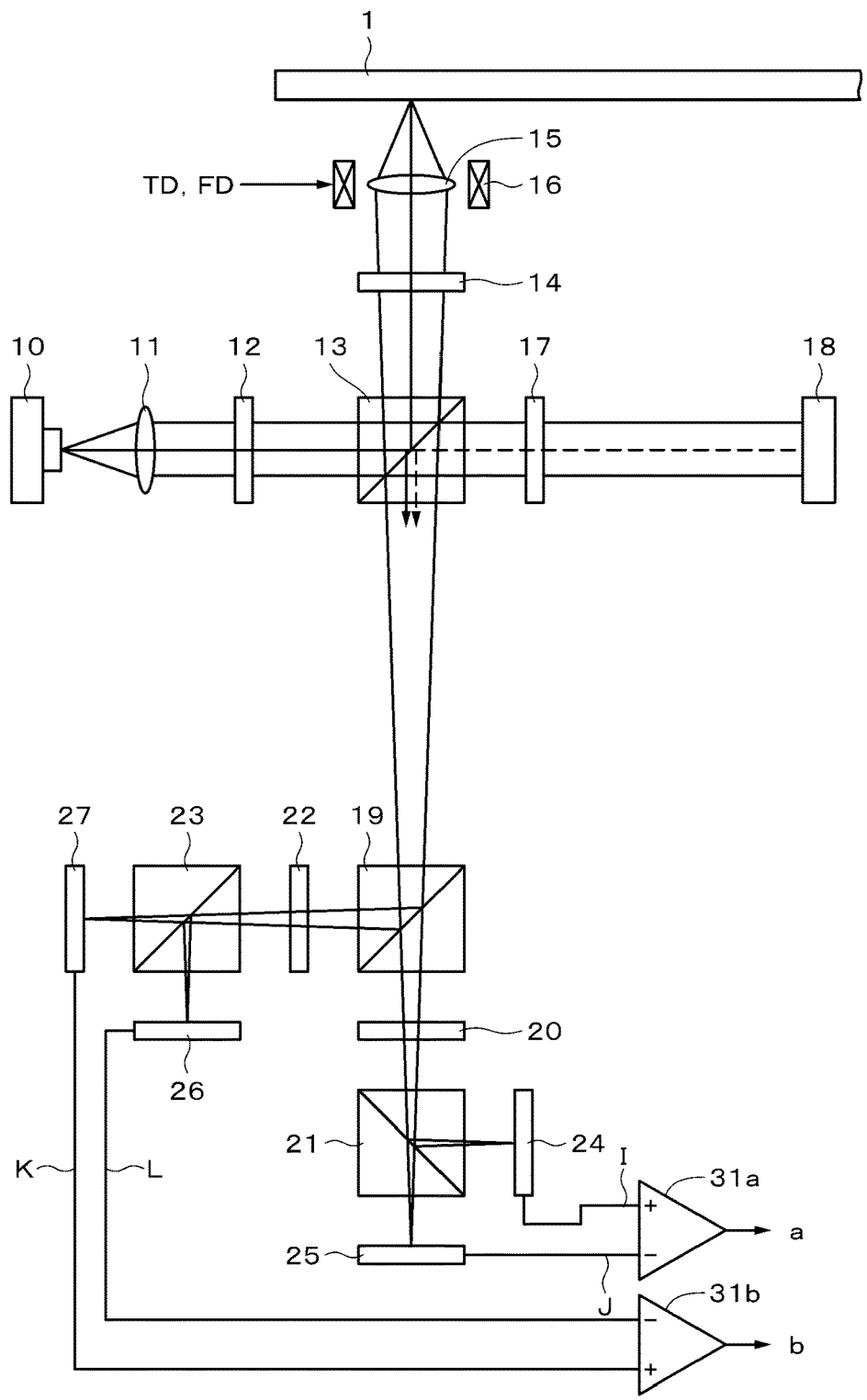
FIG. 5 is a schematic diagram illustrating a configuration of an optical system used in a reproducing apparatus.

FIG. 5 mainly illustrates the configuration of the optical system used in the phase diversity method. When the optical recording medium 1 is loaded in the reproducing apparatus, the optical recording medium 1 is rotationally driven by a spindle motor. A laser (semiconductor laser) 10 serving as a laser beam source for reproduction is provided in the optical system. The laser beam emitted from the laser 10 is collimated via the collimation lens 11, and then is incident on a polarization beam splitter 13 via a half-wavelength plate 12.

At this time, it is assumed that the polarization beam splitter 13 is, for example, configured to cause a P polarization to transmit therethrough and reflect an S polarization. It is assumed that an attachment angle (a rotation angle around an optical axis within an incident surface of the laser beam) of the half-wavelength plate 12 is adjusted so that a ratio (that is, a spectral ratio by the polarization beam splitter 13) of a light beam (P polarization component) output by transmitting through the polarization beam splitter 13 and a light beam (S polarization component) reflected and output is approximately 1:1.

The laser beam reflected by the polarization beam splitter 13 passes through a quarter-wavelength plate 14 and thereafter is applied so as to condense on the recording layer of the optical recording medium 1 via an objective lens 15 held by a biaxial actuator 16.

The biaxial actuator 16 holds the objective lens 15 displaceably in a focusing direction (a direction in which the objective lens 15 comes into contact with and separates from the optical recording medium 1) and a tracking direction (a radial direction of the optical recording medium 1: a direction orthogonal to the focus direction). The biaxial actuator 16 is provided with a focus coil and a tracking coil. A focus drive signal FD and a tracking drive signal TD, which will be described later, are supplied to the focus coil and the tracking coil, respectively. The objective lens 15 is displaced in the focus direction and in the tracking direction according to the focus drive signal FD and the tracking drive signal TD, respectively.

A reflected light beam from the recording layer of the optical recording medium 1 is incident on the polarization beam splitter 13 via the objective lens 15 and the quarter-wavelength plate 14. A polarization direction of the reflected light beam (return light beam) incident on the polarization beam splitter 13 differs by 90 degrees with respect to a polarization direction of the light beam (outward light beam) incident from the laser 10 side and reflected by the polarization beam splitter 13, by the action of the quarter-wavelength plate 14 and the action at the time of reflection at the recording layer. In other words, the reflected light beam is incident on the polarization beam splitter 13 with P polarization. Therefore, the reflected light beam transmits through the polarization beam splitter 13. Note that hereinafter, the reflected light beam reflecting the recording signal of the optical recording medium 1 that will transmit through the polarization beam splitter 13 in this way is referred to as a signal light beam.

In FIG. 5, a laser beam (P polarization) emitted from the laser 10 and transmitted through the polarization beam splitter 13 functions as a reference light beam in the homodyne detection method. The reference light beam transmitted through the polarization beam splitter 13 is reflected by a mirror 18 after passing through the quarter-wavelength plate 17 in the drawing, passes through the quarter-wavelength plate 17 again, and is incident on the polarization beam splitter 13.

Here, as described above, the reference light beam (return light beam) to be incident on the polarization beam splitter 13 differs by 90 degrees from the reference light beam as the outward light beam, by the action of the quarter-wavelength plate 17 and the action at the time of reflection on the mirror 18 (that is, S polarization). Accordingly, the reference light beam as the return light beam is reflected by the polarization beam splitter 13.

In FIG. 5, the reference light beam reflected by the polarization beam splitter 13 as described above is indicated by a broken line arrow. In FIG. 5, a signal light beam transmitted through the polarization beam splitter 13 is indicated by a solid arrow. The signal light beam and the reference light beam are emitted in the same direction by the polarization beam splitter 13 in a state of being superimposed. Specifically, in this case, the signal light beam and the reference light beam are emitted in the same direction while being superimposed so that optical axes of the signal light beam and the reference light beam are aligned. Here, the reference light beam is so-called coherent light.

The superimposed light beam of the signal light beam and the reference light beam output from the polarization beam splitter 13 is incident on a half beam splitter 19. The half beam splitter 19 splits an incident light beam into a reflected light beam and a transmitted light beam at a ratio of approximately 1:1.

The superimposed light beam of the signal light beam and the reference light beam transmitted through the half beam splitter 19 is incident on a polarization beam splitter 21 via a half-wavelength plate 20. On the other hand, the superimposed light beam of the signal light beam and the reference light beam reflected from the half beam splitter 19 is incident on a polarization beam splitter 23 via a quarter-wavelength plate 22.

The half-wavelength plate 20 and the quarter-wavelength plate 22 are capable of rotating a polarization plane. Accordingly, by combining the half-wavelength plate 20 and the polarization beam splitter 21, it is possible to adjust the ratio of the quantity of a light beam branched by the polarization beam splitter 21. Similarly, the ratio of the quantity of a light beam branched by the polarization beam splitter 23 can be adjusted by the quarter-wavelength plate 22.

The ratio of the quantity of a light beam can be adjusted so that the amount of a light beam branched by each of the polarization beam splitter 21 and 23 is approximately 1:1. A light beam reflected by the polarization beam splitter 21 is incident on a light detection unit 24, and the light beam transmitted through the polarization beam splitter 21 is incident on a light detection unit 25. A light beam reflected by the polarization beam splitter 23 is incident on a light detection unit 26, and the light beam transmitted through the polarization beam splitter 23 is incident on a light detection unit 27.

A light receiving signal output from the light detection unit 24 is denoted by I, a light receiving signal output from the light detection unit 25 is denoted by J, a light receiving signal output from the light detection unit 26 is denoted by L, and a light receiving signal output from the light detection unit 27 is denoted by K.

These light receiving signals I to L are supplied to subtraction circuits 31*a* and 31*b*. The light receiving signals I and J are supplied to the subtraction circuit 31*a*, the subtraction circuit 31*a* generates a difference signal a of (a=I−J), and the subtraction circuit 31*b* generates a differential signal b of (b=K−L).

Figure 6:
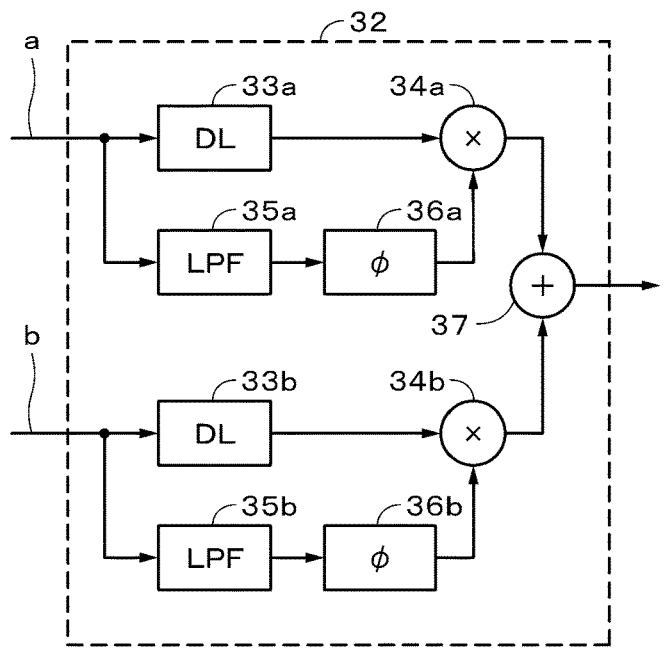
FIG. 6 is a block diagram of a signal generating system of the reproducing apparatus using a conventional phase diversity method.

As illustrated in FIG. 6, the differential signals a and b described above are supplied to an arithmetic circuit 32. The arithmetic circuit 32 includes delay circuits 33*a* and 33*b*, multiplying circuits 34*a* and 34*b*, low pass filters 35*a* and 35*b*, offset ($\phi$) setting circuits 36*a* and 36*b*, and an addition circuit 37. The delay circuit 33*a* has a delay time equal to a delay amount generated in the low pass filter 35*a* and the offset ($\phi$) setting circuit 36*a*. The delay circuit 33*b* has a delay time equal to a delay amount generated in the low pass filter 35*b* and the offset ($\phi$) setting circuit 36*b*. The output of the multiplying circuit 34*a* and the output of the multiplying circuit 34*b* are supplied to the addition circuit 37. A reproduction signal is taken out to the output of the addition circuit 37.

As described below, the above-described reproducing apparatus can obtain a reproduction signal which is not affected by the component of a phase shift (θ(t)) of the reference light beam due to surface blur of the optical recording medium 1 or the like.

The light receiving signals I to L are expressed by the following numerical expressions. The meaning of each term in the expression is illustrated below.

R: a reference light beam component

A: a reflection component of a mirror surface (land portion) formed on the recording surface of the optical recording medium f: a modulated component (taking a positive/negative value) according to presence/absence of recording mark t: sampling time φ: a phase difference between a mark to be read and an average phase of a signal light beam. A value estimated and set by a user.

θ: a difference in an optical path length between a signal light beam and a reference light beam (mainly caused by surface blur of the optical recording medium 1)

Figure 7:
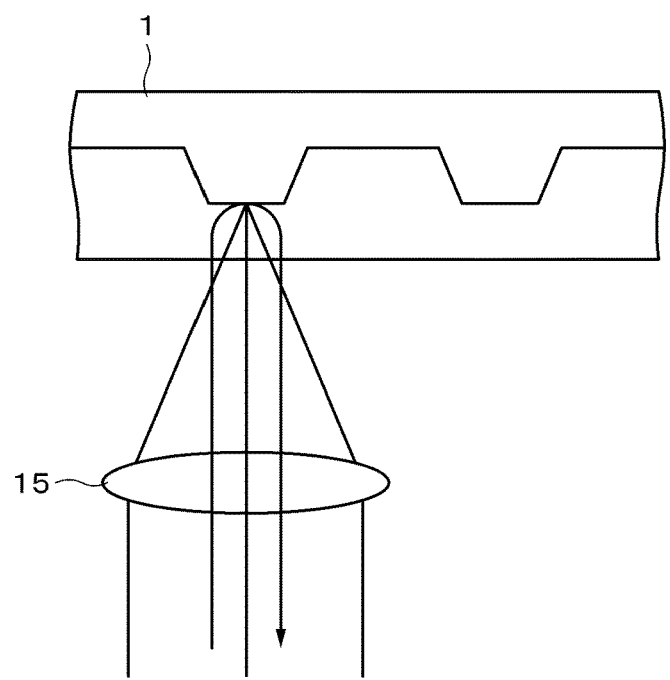
FIG. 7 is a schematic diagram for explaining the reproduction state of the optical recording medium.

As illustrated in FIG. 7, when the objective lens 15 and a signal surface of the optical recording medium 1 change due to surface blur, the optical path length of the signal light beam changes. On the other hand, since the reference light beam is reflected by the mirror 18, the optical path length does not change. As a result, the phase difference between the signal light beam and the reference light beam is shifted from the set value. The component of this phase shift is θ(t).

[Expression 1]

$$4I=|A+f(t)e^{i\phi}+Re^{i\phi}|^2=(A+f\cos\phi+R\cos\theta)^2+(f\sin\phi+R\sin\theta)^2 \quad (1)$$

[Expression 2]

$$4J=|A+f(t)e^{i\phi}-Re^{i\phi}|^2=(A+f\cos\phi-R\cos\theta)^2+(f\sin\phi-R\sin\theta)^2 \quad (2)$$

[Expression 3]

$$4K=|A+f(t)e^{i\phi}+Re^{i\phi}|^2=(A+f\cos\phi-R\cos\theta)^2+(f\sin\phi+R\sin\theta)^2 \quad (3)$$

[Expression 4]

$$4I=|A+f(t)e^{i\phi}-Re^{i\phi}|^2=(A+f\cos\phi+R\cos\theta)^2+(f\sin\phi-R\sin\theta)^2 \quad (4)$$

The difference signal a (=I−J) of the subtraction circuit 31a and the difference signal b (=K−L) of the subtraction circuit 31b are as illustrated in the following expressions.

[Expression 5]

$$a=I-J=(A+f\cos\phi)R\cos\theta+fR\sin\phi\sin\theta=AR\cos\theta+fR\cos(\phi-\theta) \quad (5)$$

[Expression 6]

$$b=K-L=-(A+f\cos\phi)R\sin\theta+f\sin\phi R\cos\theta=-AR\sin\theta+fR\sin(\phi-\theta) \quad (6)$$

As illustrated in FIG. 8A, even in ordinary detection without using homodyne detection, the DC component of the reproduction signal appears in accordance with the mirror portion of the background. In a case of homodyne detection, as illustrated in FIG. 8B, the DC component corresponding to the mirror portion undulates according to a phase θ corresponding to a difference in a reference light beam optical path length.

In order to obtain the phase θ, the difference signals a and b illustrated in FIG. 8B are supplied to the low pass filters 35a and 35b, respectively. As illustrated in FIG. 8C, cos θ(t) and sin θ(t) can be obtained by the low pass filters 35a and 35b. In other words, in the numerical expressions (5) and (6), since f is assumed to be a modulation component (taking a positive/negative value) according to presence/absence of the recording mark, it is considered that a term multiplied by the function f disappears and the terms of sin θ and cos θ remain.

Since (tan θ=sin θ/cos θ), θ is obtained by (arctan θ=θ), φ (offset) is set, the multiplying circuit 34a multiplies (cos(#−θ(t)) by a, and the multiplying circuit 34b multiplies (sin (φ−θ(t)) by b. Then, the multiplication output is added by the addition circuit 37. The reproduction signal obtained from the addition circuit 37 is represented by the following expression.

[Expression 7]

$$a\cdot\cos(\phi-\theta(t))+b\cdot\sin(\phi-\theta(t))=f(t)R+AR\cos\phi \quad (7)$$

As can be seen from this numerical expression, in the reproduction signal, the component of θ(t) disappears and the reproduction signal becomes a stable signal. Note that as the homodyne detection system, there is a method of performing the position control of the mirror 18 to cancel the phase difference between the signal light beam and the reference light beam caused by surface blur. However, according to the phase diversity method, such a configuration for position control of the mirror 18 can be omitted. Moreover, it can be seen that a reproduction result obtained by amplifying the component of the signal light beam with the component of the reference light beam can be obtained. In other words, the recording signal of the optical recording medium 1 is amplified and detected, and improvement of SNR is attained in this respect. Note that the term of the phase diversity method means a method of obtaining a reproduction signal by calculating the square root of the square sum (a2+b2) or the square sum of the differential signals a and b. In the present specification, as described above, the term of the phase diversity method is used even for the arithmetic operation in which (cos(φ−θ(t)) is multiplied by a and in the multiplying circuit 34b, (sin(φ−θ(t)) is multiplied by b.

It is assumed that the optical recording medium of the land/groove recording as described above is reproduced by the optical system illustrated in FIG. 9A. The result obtained by a simulation of jitter of the reproduction signal (groove reproduction signal or land reproduction signal) when a track pitch Tp is changed is illustrated in the graph of FIG. 9B. Note that jitter is one of indicators indicating playback performance, and indexes other than jitter may be used.

As illustrated in FIG. 9A, a laser beam from a laser diode 41 passes through a lens 42, a polarization beam splitter 43, and an objective lens 44 and is applied onto the signal surface of the optical recording medium 1. A reflected light beam from the signal surface is reflected by the polarization beam splitter 43 and is supplied to a light detection unit 46 via a lens 45. A reproduction signal is obtained from the light detection unit 46. A reproducing optical system illustrated in FIG. 9A does not use the above-described homodyne detection.

The simulation is performed under the following calculation conditions. Note that it is assumed that there is no surface blur, and a reproducing method that reduces crosstalk between tracks is used.

λ=405 nm, NA=0.85, rim=65%/65%, and groove duty=50%

Slope=90 degrees, mark reflectivity=0%, mark width=0.9 Tp, and linear density=25 GB constant For each of (Mrr (meaning a mirror, d=0), (d=0.125λ), (d=0.15λ), and (d=0.175λ)), the graph illustrated in FIG. 9B illustrates the change of a jitter value with respect to Tp. For example, in (Tp=0.22), jitter can be reduced with respect to the depth of a groove other than a mirror. Moreover, even if the depth of the groove is different, the jitter change can be made almost a similar.

FIG. 10 illustrates a simulation result when the optical recording medium 1 of land/groove recording is reproduced by using homodyne detection. As illustrated in FIG. 10A, a mirror 47 is provided, and the reflected light beam (signal light beam) from the optical recording medium 1 and the reflected light beam (reference light beam) from the mirror 47 are supplied to the light detection unit 46 via the lens 45.

FIG. 10B illustrates a simulation result when the optical system illustrated in FIG. 10A is used. Calculation conditions of the simulation are similar to those in FIG. 9B. For each of (Mrr (meaning a mirror, d=0), (d=0.1λ), (d=0.125λ=λ/8), (d=0.15λ), and (d=0.175λ)), the graph illustrated in FIG. 10B illustrates the change of a jitter value with respect to Tp.

For example, in (Tp=0.15), jitter can be reduced compared with the mirror. However, the change of a jitter value varies depending on the value of depth d. In other words, in a case of (d=0.125λ=λ/8), jitter can be greatly improved, whereas in the case of (d=0.175λ), jitter is too large. Moreover, the values of jitter in cases of (d=0.1λ) and (d=0.15λ) are not sufficiently satisfactory. In a case of d=λ/8, since a phase difference of 90 degrees can be generated between the groove reproduction signal and the land reproduction signal, crosstalk can be reduced and jitter can be improved.

As described above, restriction on design of the optical recording medium 1 arises that satisfactory reproduction performance can be obtained only for a case of the depth d for a specific groove. Moreover, the value of d=λ/8 is a relatively large value, which is not preferable in terms of recording marks on the land between the grooves. Moreover, in a case where d is large, it is difficult to make a surface of a wall of a step steep without inclination when molding the optical disk. Accordingly, it is preferable that the value of d is not limited to (λ/8).

2. Improved Homodyne Detection Method

Figure 11:
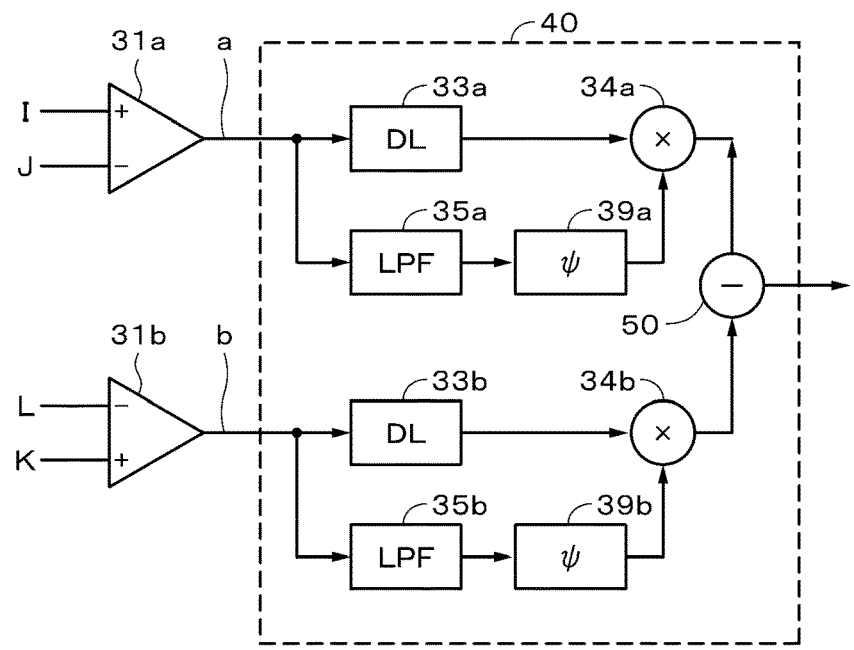
FIG. 11 is a block diagram of an improved homodyne system signal generating system.

In order to improve this point, a reproducing optical system similar to that illustrated in FIG. 5 is used and a reproduction signal generating circuit similar to that illustrated in FIG. 6 is used. A difference signal formed from the light receiving signals I to L output from the light detection units 24 to 27 in FIG. 5 is supplied to the reproduction signal generating circuit having a configuration as illustrated in FIG. 11.

The reproduction signal generating circuit includes the subtraction circuits 31a and 31b and an arithmetic circuit 40. The light receiving signals I and J are supplied to the subtraction circuit 31a, the subtraction circuit 31a generates a difference signal a of (a=I−J), and the arithmetic circuit 31b generates a differential signal b of (b=K−L). The difference signal a of the subtraction circuit 31a and the difference signal b of the subtraction circuit 31b are supplied to the arithmetic circuit 40.

The arithmetic circuit 40 has delay circuits 33a and 33b, multiplying circuits 34a and 34b, low pass filters 35a and 35b, offset (Ψ) setting circuits 39a and 39b, and a subtraction circuit 40. The delay circuit 33a has a delay time equal to a delay amount generated in the low pass filter 35a and the offset (Ψ) setting circuit 39a. The delay circuit 33b has a delay time equal to a delay amount generated in the low pass filter 35b and the offset (Ψ) setting circuit 39b. The output of the multiplying circuit 34a and the output of the multiplying circuit 34b are supplied to a subtraction circuit 50. A reproduction signal is taken out to the output of the subtraction circuit 50.

As described below, in the offset (Ψ) setting circuits 39a and 39b, a value (Ψ) corresponding to the phase difference between a crosstalk component and an average phase of the signal light beam is estimated by the user and set as a fixed value. For example, a step between the groove G and the land L, that is, a phase offset according to the depth d is set. Since the value of the depth d of the optical recording medium 1 to be reproduced is known beforehand, it is possible to set the offset Ψ.

As described below, in the above-described homodyne system, a reproduction signal which is free from the influence of the component of the phase shift (θ(t)) of the reference light beam due to surface blur of the optical recording medium 1 or the like and in which an inter-track crosstalk has been removed is obtained. As described with reference to FIGS. 3 and 4, in the land/groove recording method, when the track pitch narrows, crosstalk occurs from the adjacent track. As illustrated in FIG. 4, when the groove is reproduced, not only the reproduction signal f(t) of the groove but also the reproduction signal g(t) of the adjacent land are mixed. When a phase φ of the groove reproduction signal is equal to 0, the land phase Ψ is equal to 4πnd/λ (λ is a wavelength and n is a refractive index of the substrate of the optical recording medium 1).

The light receiving signals I to L are obtained using the reproducing optical system illustrated in FIG. 5. The meanings of each term in the expression are described below as in the above-described numerical expression.

R: a reference light beam component

A: a reflection component of a mirror surface (land portion) formed on the recording surface of the optical recording medium f: a modulated component (taking a positive/negative value) according to presence/absence of recording mark g: crosstalk component from adjacent track t: sampling time φ: a phase difference between a mark to be read and an average phase of a signal light beam. A value estimated and set by a user.

θ: a difference in an optical path length between a signal light beam and a reference light beam (mainly caused by surface blur of the optical recording medium 1)

Ψ: a phase difference between the crosstalk component and the average phase of the signal light beam. A value estimated and set by a user.

[Expression 8]

$$4I=|A+f(t)e^{i\phi}+g(t)e^{i\psi}+Re^{i\theta}|^2=(A+f\cos\phi+g\cos\psi+R\cos\theta)^2+(f\sin\phi+g\cos\psi+R\sin\theta)^2 \quad (8)$$

[Expression 9]

$$4J=|A+f(t)e^{i\phi}+g(t)e^{i\psi}-Re^{i\theta}|^2=(A+f\cos\phi+g\cos\psi-R\cos\theta)^2+(f\sin\phi+g\cos\psi-R\sin\theta)^2 \quad (9)$$

[Expression 10]

$$4K=|A+f(t)e^{i\phi}+g(t)e^{i\psi}+iRe^{i\theta}|^2=(A+f\cos\phi+g\cos\psi+R\sin\theta)^2+(f\sin\phi+g\sin\psi+R\cos\theta)^2 \quad (10)$$

[Expression 11]

$$4L=|A+f(t)e^{i\phi}+g(t)e^{i\psi}-iRe^{i\theta}|^2=(A+f\cos\phi+g\cos\psi+R\sin\theta)^2+(f\sin\phi+g\sin\psi-R\cos\theta)^2 \quad (11)$$

Moreover, an arithmetic operation is performed using the reproduction signal generating circuit illustrated in FIG. 11. The difference signal a (=I−J) of the subtraction circuit 31a and the difference signal b (=K−L) of the subtraction circuit 31b are as illustrated in the following expressions.

[Expression 12]

$$a=I-J=(A+f\cos\phi+g\cos\psi)R\cos\theta+(f\sin\phi+g\sin\psi)R\sin\theta=AR\cos\theta+fR\cos(\phi-\theta)+gR\cos(\psi-\theta) \quad (12)$$

[Expression 13]

$$b=K-L=-(A+f\cos\phi+g\cos\psi)R\sin\theta+(f\sin\phi+g\sin\psi)R\cos\theta=AR\sin\theta+fR\sin(\phi-\theta)+gR\sin(\psi-\theta) \quad (13)$$

As described above, cos θ(t) and sin θ(t) are obtained by the low pass filters 35a and 35b. In other words, in the numerical expressions (12) and (13), since f is assumed to be a modulation component (taking a positive/negative value) according to presence/absence of the recording mark, and g is a crosstalk component from the adjacent track, it is considered that a term multiplied by the functions f and g disappears and the terms of sin θ and cos θ remain. Since (tan θ=sin θ/cos θ), θ is obtained by (arctan θ=θ), Ψ (offset) is set by the offset (Ψ) setting circuits 39a and 39b, the multiplying circuit 34a multiplies (sin(Ψ−θ(t)) by a, and the multiplying circuit 34b multiplies (cos(Ψ−θ(t)) by b. Then, the subtraction circuit 40 combines these multiplication outputs. The reproduction signal obtained from the subtraction circuit 40 is represented by the following expression.

[Expression 14]

$$a\times\sin(\psi-\theta(t))-b\times\cos(\psi-\theta(t))=AR\cos\theta\sin(\psi-\theta)+fR\cos(\phi-\theta)\sin(\psi-\theta)-fR\sin(\phi-\theta)\cos(\psi-\theta)=f(t)R\sin(\psi-\theta)+AR\sin\psi \quad (14)$$

As illustrated in the expression (14), in the reproduction signal, the component of θ(t) disappears and the reproduction signal becomes a stable signal. In addition, the reproduction signal g(t) of the adjacent track is not included in the reproduction signal, and an inter-track crosstalk is eliminated.

Figure 12:
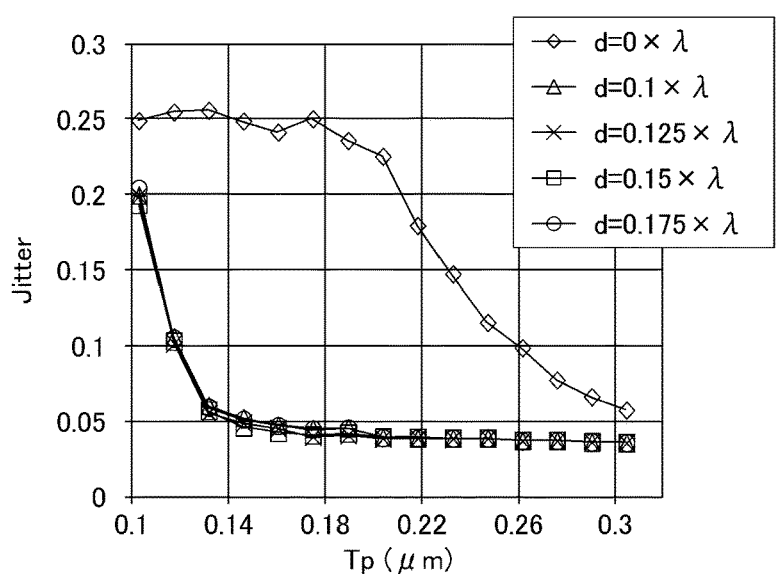
FIG. 12 is a graph illustrating a result of a simulation of a relationship between the track pitch and the jitter in the improved homodyne system signal generating system.

FIG. 12 illustrates a simulation result when an optical system similar to the optical system illustrated in FIG. 10A is used. Calculation conditions of the simulation are similar to those in FIG. 9B and FIG. 10B. For each of (Mrr (meaning a mirror, d=0), (d=0.1λ), (d=0.125λ=λ/8), (d=0.15λ), and (d=0.175λ)), the graph illustrated in FIG. 12 illustrates the change of a jitter value with respect to Tp.

As can be seen from the graph of FIG. 12, it is possible to reduce jitter with respect to all the values of d except the mirror. In the case of FIG. 10B described above, jitter can be greatly improved only in the case of (d=0.125λ=λ/8), whereas in the improved homodyne system, even if d is another value, jitter can be greatly improved.

3. One Embodiment

In the above-described improved homodyne system, the influence of the shift of the phase difference θ between the signal light beam and the reference light beam can be eliminated, and moreover, crosstalk can be eliminated by previously setting the offset Ψ according to the phase difference between the crosstalk component and the average phase of the signal light beam. Therefore, θ corresponding to a difference in an optical path length between the signal light beam and the reference light beam is obtained by the low pass filters 35a and 35b. However, in the case of the low pass filter, it is difficult to sufficiently remove a noise component, and there is also a possibility that a signal component is removed.

The present technology has been considered in consideration of such points. The present technology eliminates the influence of the shift of the phase difference θ between the signal light beam and the reference light beam without using a low pass filter. In other words, the present technology suppresses deterioration of signal quality due to fluctuation (perturbation factor) by using an extracted phase fluctuation component. For the difference signals a and b, an arithmetic operation is performed using the extracted phase fluctuation component. As a result, signals represented by the following expressions (15) and (16) can be independently read.

[Expression 15]

$$a\times\sin(\psi-\theta(t))-b\times\cos(\psi-\theta(t)) \quad (15)$$

[Expression 16]

$$a\times\sin(\phi-\theta(t))-b\times\cos(\phi-\theta(t)) \quad (16)$$

Figure 13:
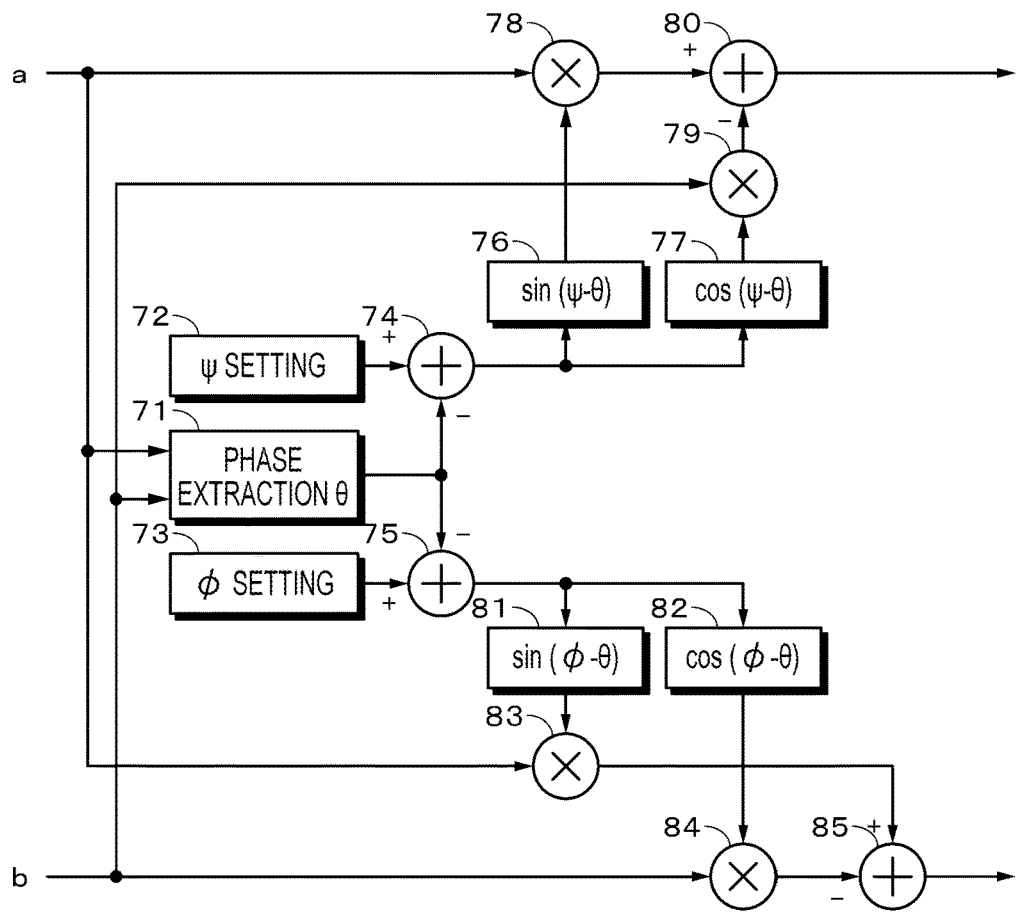
FIG. 13 is a block diagram used for explaining one embodiment of the present technology.

FIG. 13 illustrates a configuration example of one embodiment. The difference signals a and b are supplied to a phase (θ) extraction circuit 71, and the phase is extracted. Offset setting circuits 72 and 73 are provided, and respectively output offsets φ and Ψ set corresponding to an optical disc to be reproduced. As described above, φ is a phase difference between the mark to be read and the average phase of the signal light beam, and Ψ is the phase difference between the crosstalk component and the average phase of the signal light beam. These offsets are the values estimated and set by the user.

The output of the phase extraction circuit 71 and the output of the offset setting circuit 72 are supplied to a subtraction circuit 74, and the phase of (Ψ−θ) is obtained from the subtraction circuit 74. Signal generating circuits 76 and 77 respectively generate a sine wave and a cosine wave synchronized with the phase of (Ψ−θ). The difference signal a, and the sine wave from the signal generating circuit 76 are supplied to a multiplying circuit 78, and the output signal of the multiplying circuit 78 is supplied to a subtraction circuit 80. The difference signal b, and the cosine wave from the signal generating circuit 77 are supplied to a multiplying circuit 79, and the output signal of the multiplying circuit 79 is supplied to the subtraction circuit 80. The reproduction signal represented by the expression (15) is taken out for the output of the subtraction circuit 80.

The output of the phase extraction circuit 71 and the output of the offset setting circuit 73 are supplied to a subtraction circuit 75, and the phase of (φ−θ) is obtained from the subtraction circuit 75. The signal generating circuits 81 and 82 respectively generate a sine wave and a cosine wave synchronized with the phase of (φ−θ). The difference signal a, and the sine wave from the signal generating circuit 81 are supplied to a multiplying circuit 83, and the output signal of the multiplying circuit 83 is supplied to a subtraction circuit 85. The difference signal b, and the cosine wave from the signal generating circuit 82 are supplied to a multiplying circuit 84, and the output signal of the multiplying circuit 84 is supplied to the subtraction circuit 85. The reproduction signal represented by the expression (16) is taken out for the output of the subtraction circuit 85.

In the difference signals a and b, since a portion to which f and g are applied is an AC component, the AC component becomes 0 by performing integration, and only a DC component remains. In other words, a=AR cos θ, and b=−AR sin θ remain. On the other hand, when θ is known, if the following arithmetic operation is performed on the difference signals a and b, the DC component becomes 0.

a sin θ+b cos θ→0

In order to set the value of (Δθ) to 0 by changing θ when the above expression is not 0 at θ(t) of the present time, the relationship of the following expression is necessary.

a sin(θ+Δθ)+b cos(θ+Δθ)=aΔθ cos θ+a sin θ+b cos θ−bΔθ sin θ=0

A successive change amount Δθ of θ is obtained by using the following sequential expression (Expression 17). The phase θ is obtained by updating θ by the successive change amount Δθ. In other words, a relationships of θt+1=θt+Δθt holds. In Expression 17, η is a learning coefficient, F is a function, for example, F (x) is x, sin(x), a tan (x), tan h(x), and the like.

[Expression 17]

$$\Delta\theta_t = \eta \cdot F\left(\frac{a_t \sin\theta_t + b_t \cos\theta_t}{b_t \sin\theta_t \ a_t \cos\theta_t}\right) \quad (17)$$

Figure 14:
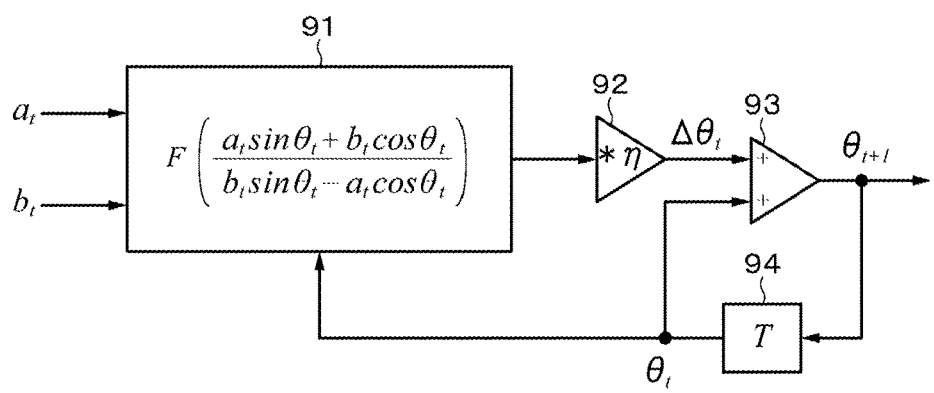
FIG. 14 is a block diagram of an example of a configuration of a phase extraction circuit.

An example of the phase extraction circuit 71 is illustrated in FIG. 14. The phase extraction circuit 71 extracts the phase θ by a successive phase detection method. The difference signals a and b are supplied to an arithmetic circuit 91, and the arithmetic operation of the above-described expression (Expression 17) is performed. The output signal of the arithmetic circuit 91 is supplied to a coefficient multiplying circuit 92 and then multiplied by a learning coefficient η.

The output of the coefficient multiplying circuit 92 is supplied to an addition circuit 93. The obtained (θt+1=Δθt+θt) appears at the output of the addition circuit 93. The output of the addition circuit 93 is taken out as θt+1 and then supplied to the arithmetic circuit 91 and the addition circuit 93 via a delay circuit 94 of one sample period T.

An example of simulation for one embodiment of the present technology will be described. The simulation conditions are as follows.

In the sequential expression (Expression 17), it is defined that F=1 and η=0.007.
 Disk space: 33.4 GB
 Tp=0.16 μm (each land and groove)
 Groove depth: λ/8
 Mark reflectivity: 0.3 (no phase)
 PR(12221)
 Evaluation index: i-MLSE FIG. 15 illustrates a simulation result. FIG. 15A illustrates the difference signals a and b and the waveforms of the following signals represented by the above-mentioned expression (15).

(a×sin(Ψ−θ(t))−(b×cos(Ψ−θ(t)))

FIG. 15B illustrates the change of θ. FIG. 15C illustrates the value of i-MLSE before applying sequential phase correction of the present technology (in other words, the difference signals a and b) and the value of i-MLSE after applying the sequential phase correction of the present technology (in other words, the waveform on the lowermost side in FIG. 15A). A maximum likelihood sequence error (MLSE) is obtained by calculating an index corresponding to an error probability by using a difference in level of an actual signal with respect to a target level set using Viterbi detected data. Since smaller values of i-MLSE are better reproduction, it can be seen that good reproduction is possible by applying the present technology.

According to the present technology described above, compared to the method of detecting θ through the low pass filter of the difference signals a and b, there is an advantage that stable signal processing can be performed.

4. Example of Photoelectric Conversion Circuit

In the above-described homodyne detection method, as described with reference to FIG. 8B in the output signals of the light receiving elements, for example, in the difference signals a and b, there is a problem that the dynamic range of the photoelectric conversion circuit is consumed and the SNR of the modulation component is lowered because the level of an unmodulated low frequency component is large. If the photoelectric conversion circuit is AC-coupled, the SNR of the modulation component can be secured, but there is a problem that part of the information of the reference light beam phase is lost.

The photoelectric conversion circuit described below can solve such a problem. In other words, after photoelectrically converting the reproduction light beam with two light receiving elements for AC and DC, the original reproduction signal is restored by adding an AC component and a DC component by an adder capable of securing a wide dynamic range and a high SNR. The photoelectric conversion circuit can be applied to each of the light detection units 24 to 27 in the optical system illustrated in FIG. 5, for example.

With such a configuration, the entire dynamic range of a light receiving circuit can be occupied by modulation components, and degradation of SNR can be prevented. Furthermore, by adding signals from the two photoelectric conversion circuits with an adder capable of securing the dynamic range, it is possible to narrow the band of the signal input to the adder from a DC coupling side, and to reduce the noise of the signal after addition.

Figure 16:
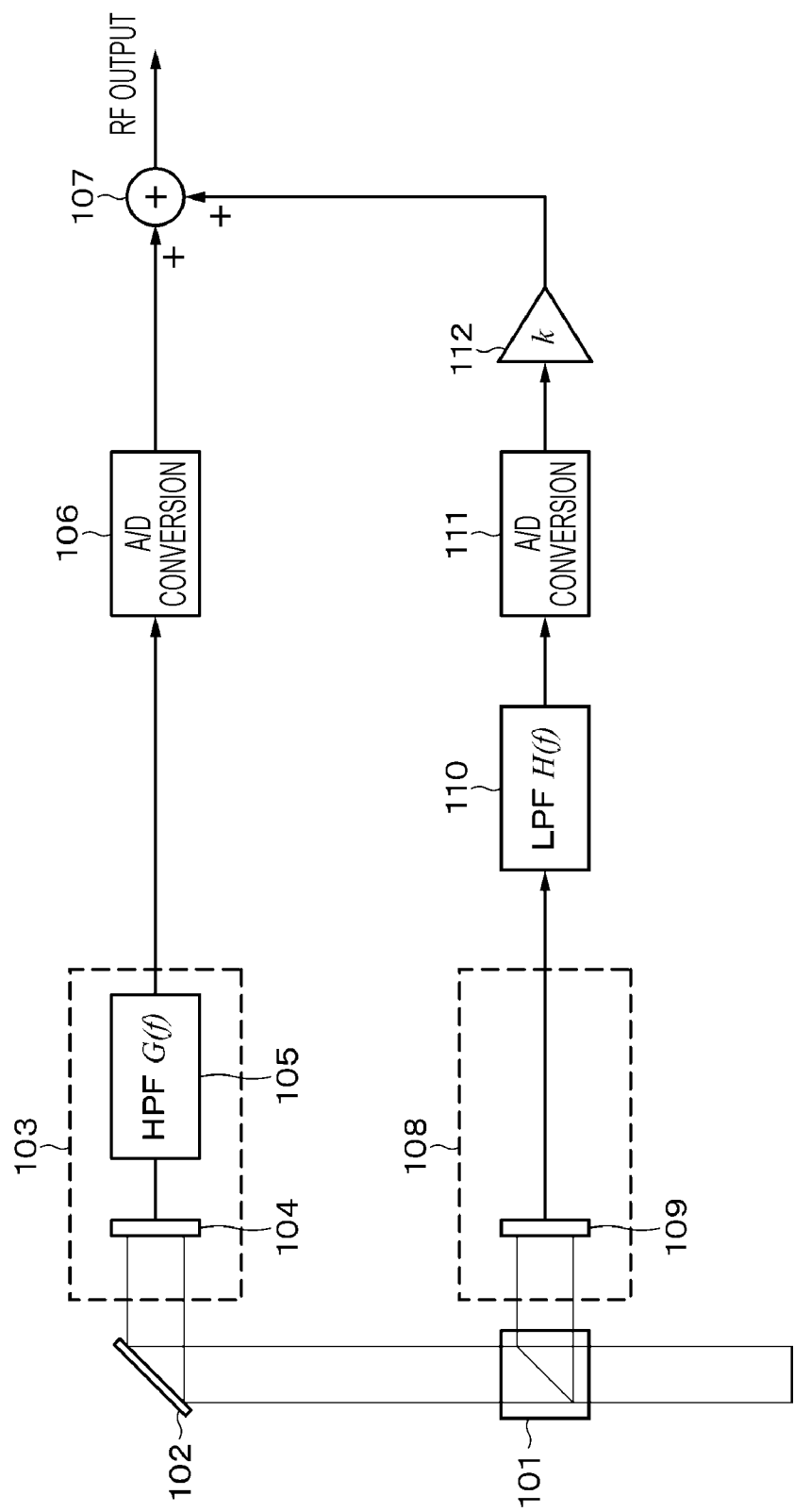
FIG. 16 is a block diagram of a first example of a photoelectric conversion circuit for forming an RF signal from the output of a photoelectric conversion element.

FIG. 16 illustrates a first example of the photoelectric conversion circuit. The reproduction light beam is split by a beam splitter 101 and a mirror 102. The reproduction light beam from the mirror 102 is incident on a photoelectric conversion circuit 103 in which a photodetector (light receiving element) 104 and a high pass filter 105 are connected in series, and is converted into an electric signal. A low frequency component is removed by the high pass filter 105, and a high frequency component from a high pass filter 105 is converted into a digital signal by an A/D converter 106. The digital signal is supplied to an adder 107. A cutoff frequency of the high pass filter 105 is selected to be a frequency that can eliminate low-frequency fluctuation of the reproduction signal.

The reproduction light beam from the beam splitter 101 is incident on a photodetector 109 of a photoelectric conversion circuit 108, and a reproduction signal is obtained. The reproduction signal is supplied to a low pass filter 110. The low frequency component separated by the low pass filter 110 is converted into a digital signal in an A/D converter 111. The output of the A/D converter 111 is supplied to a coefficient multiplier 112. The output of the coefficient multiplier 112 is supplied to the adder 107. The output of the coefficient multiplier 112 is then added to a high frequency component by the adder 107. From the adder 107, a low frequency component and a high frequency component are obtained.

The frequency characteristic of the low pass filter 110 is complementary to the frequency characteristic of the high pass filter 105. In other words, assuming that the transfer function of the high pass filter 105 is H(f) and the transfer function of the low pass filter 110 is G(f), the relationship is H(f)=1−G(f), and after addition, a gain is kept constant within a predetermined band. The first example of the photoelectric conversion circuit illustrated in FIG. 16 has an advantage that a reference light beam servo is not required.

Figure 17:
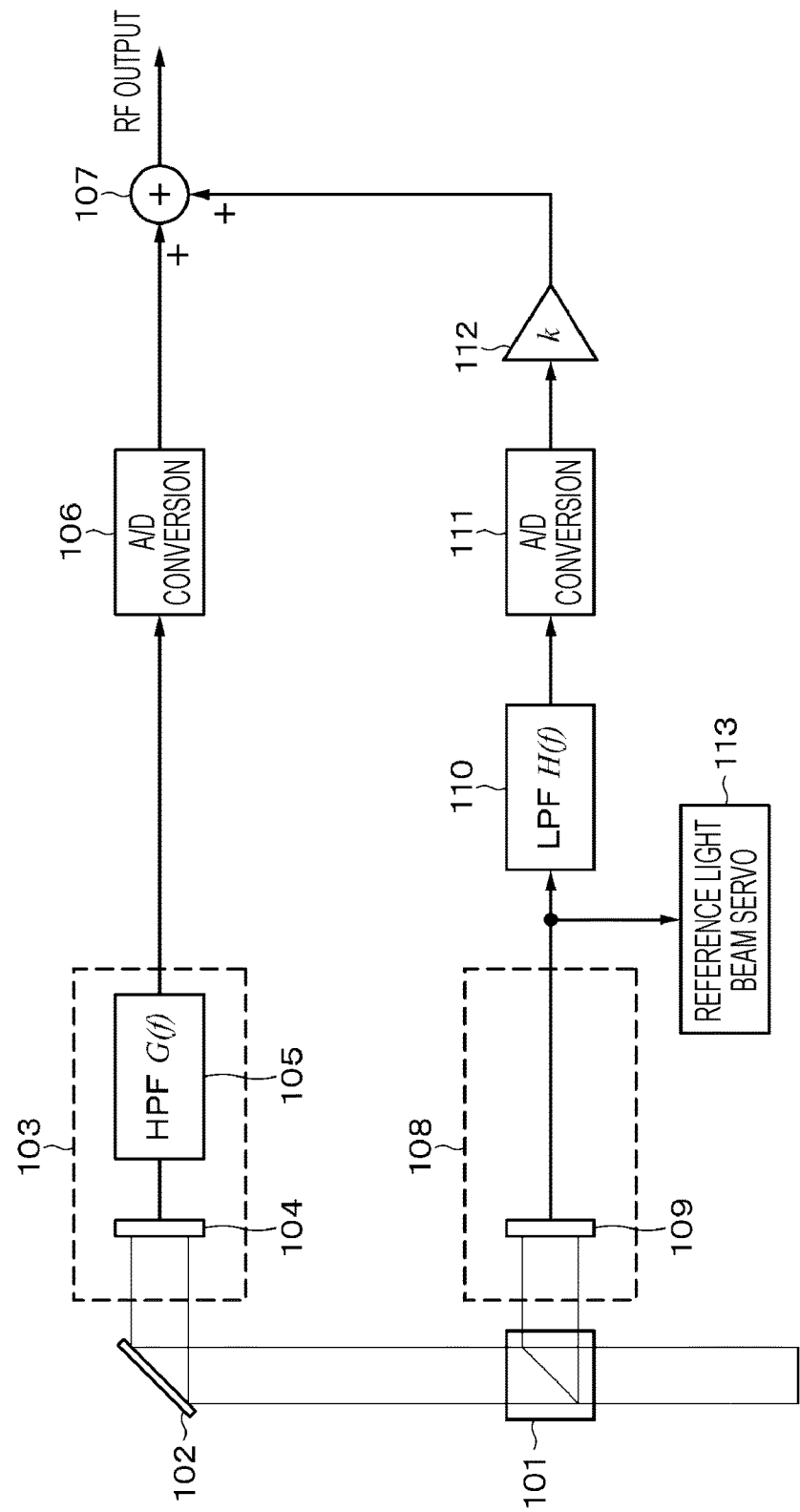
FIG. 17 is a block diagram of a second example of the photoelectric conversion circuit.

FIG. 17 illustrates a second example of the photoelectric conversion circuit. In the second example, a reference light beam servo 113 is added to the configuration of the above-described first example. In other words, an electric signal from the photoelectric conversion circuit 108 is supplied to the low pass filter 110 and the reference light beam servo 113. The reference light beam servo 113 physically makes the optical path length of the reference light beam changeable. For example, the reference light beam servo 113 has a configuration in which the position of the mirror 18 (see FIG. 5) in the optical path of the reference light beam is moved by a control signal to make the optical path length of the reference light beam changeable. The time variation of the phase difference between the signal light beam and the reference light beam can be removed by the reference light beam servo.

The output of the low pass filter 110 is a residual component of the low frequency component. The residual component is digitized by the A/D converter 111, multiplied by coefficients by coefficient multiplier 112, and supplied to the adder 107. In the adder 107, the low frequency component is added to the high frequency component. From the adder 107, a residual component of the low frequency component is obtained.

Figure 18:
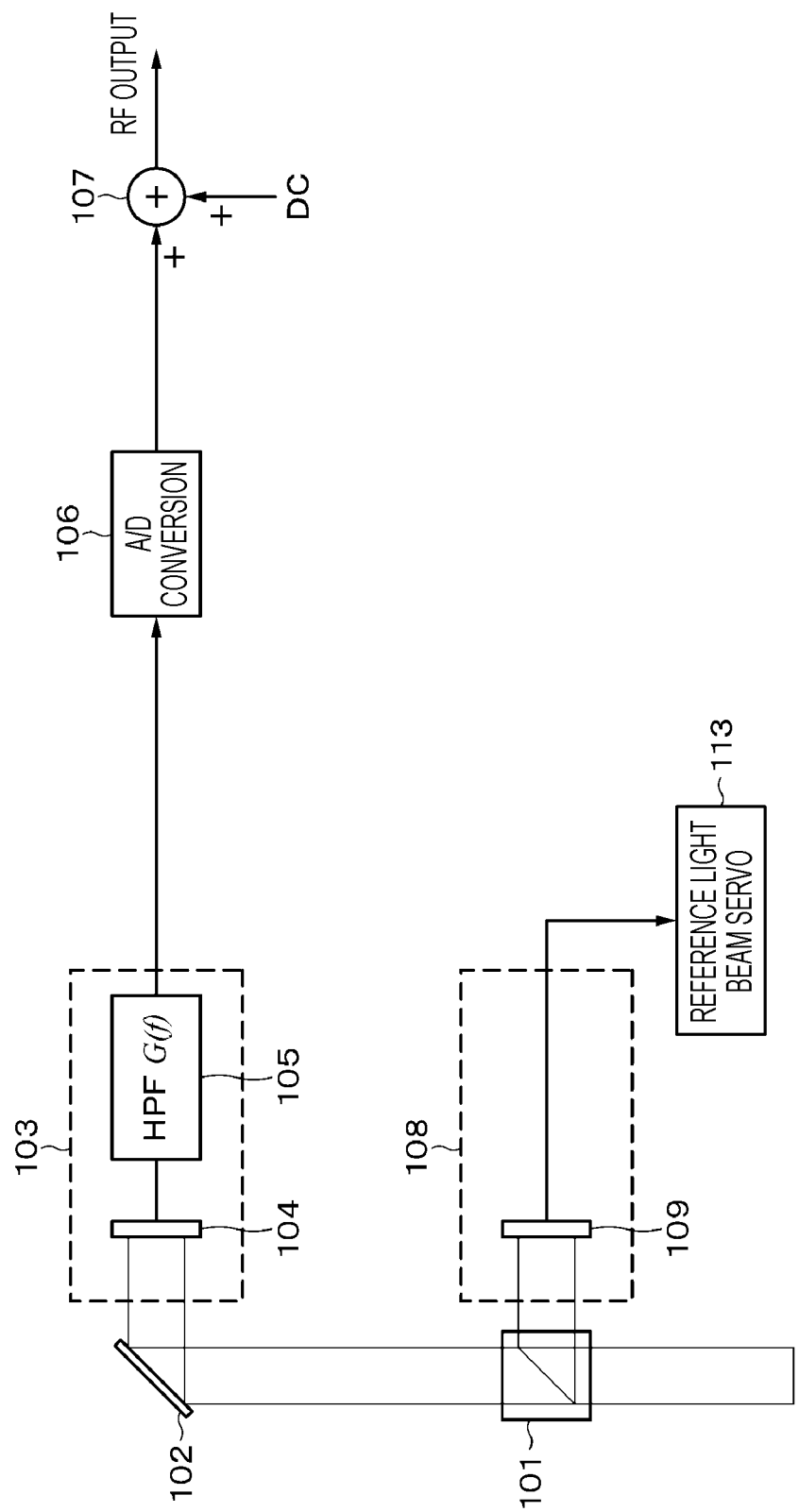
FIG. 18 is a block diagram of a third example of the photoelectric conversion circuit.

FIG. 18 illustrates a third example of the photoelectric conversion circuit. In the third example, a fixed DC value is added to the configuration of the second example in the adder 107. Since the reference light beam servo 113 is provided, the time variation of the phase difference between the signal light beam and the reference light beam can be removed, so that the fixed DC value is added in the adder 107. The fixed DC value is a value previously obtained.

Figure 19:
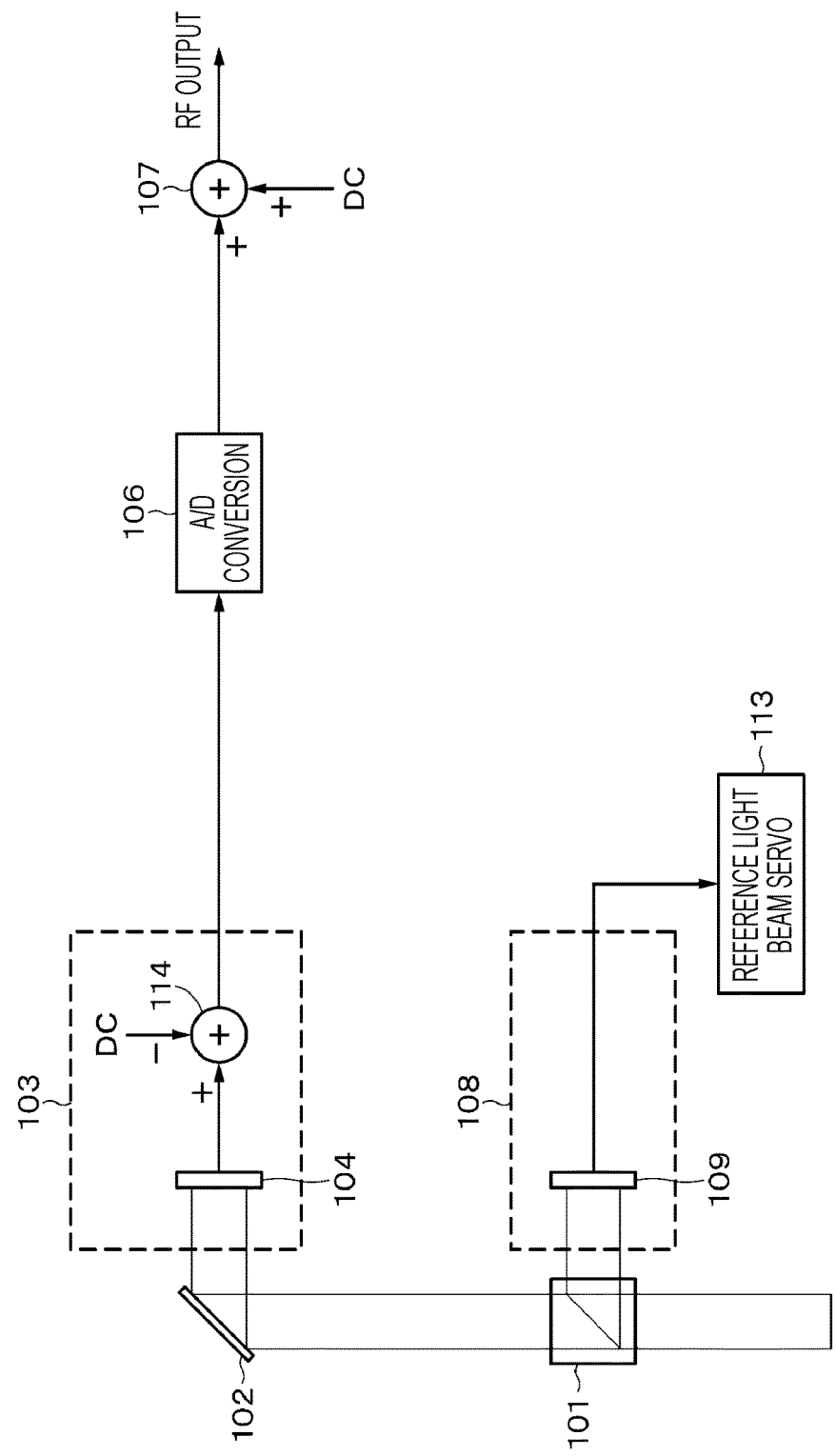
FIG. 19 is a block diagram of a fourth example of the photoelectric conversion circuit.

FIG. 19 illustrates a fourth example of the photoelectric conversion circuit. The reference light beam servo 113 is provided. The output of the photodetector 104 of the photoelectric conversion circuit 103 is supplied to a subtractor 114, and the fixed DC value is subtracted from the output of the photodetector 104. The fixed DC value is a value previously obtained. The output of the subtractor 114 is supplied to the A/D converter 106. A low frequency component is removed beforehand at the input side of the A/D converter 106.

Figure 20:
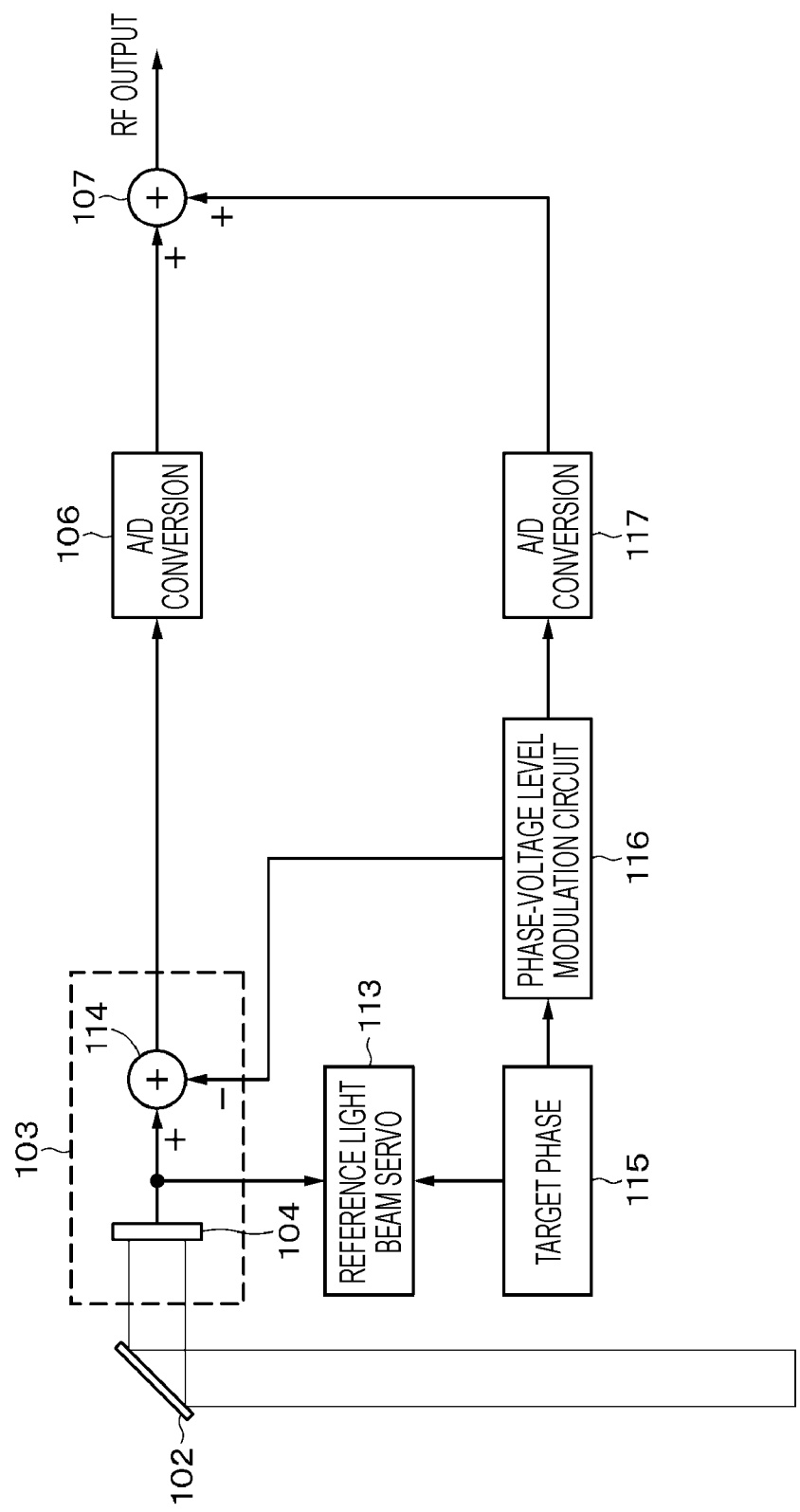
FIG. 20 is a block diagram of a fifth example of the photoelectric conversion circuit.

FIG. 20 illustrates a fifth example of the photoelectric conversion circuit. The reference light beam servo 113 is provided. To the reference light beam servo 113, an output signal of the photodetector 104 and a target phase (for example, a DC value corresponding to the target phase) 115 are given. The reference light beam servo 113 makes the phase of the output signal of the photodetector 104 coincide with the target phase.

The output of the photodetector 104 is supplied to the subtractor 114. A voltage (DC value) of a level corresponding to the target phase is formed by a phase-voltage level modulation circuit 116. This DC value is supplied to the subtractor 114 and then subtracted from the output signal of the photodetector 104. The signal obtained at the output of the subtractor 114 has an extremely low frequency component. Then, the voltage (DC value) of the level corresponding to the target phase is added in the adder 107. Note that in a case where the DC value is added by the adder 107, a level correction coefficient for the DC value may be multiplied. It is possible to avoid the limitation of a dynamic range of an analog circuit in the path from the photodetector 104 to the A/D converter 106. Furthermore, the configuration of FIG. 20 has an advantage that it is not necessary to divide the optical path. In a case of a configuration where the optical path division is unnecessary, the difference signal a or b may be used instead of the output signal of the photodetector 104.

Figure 21:
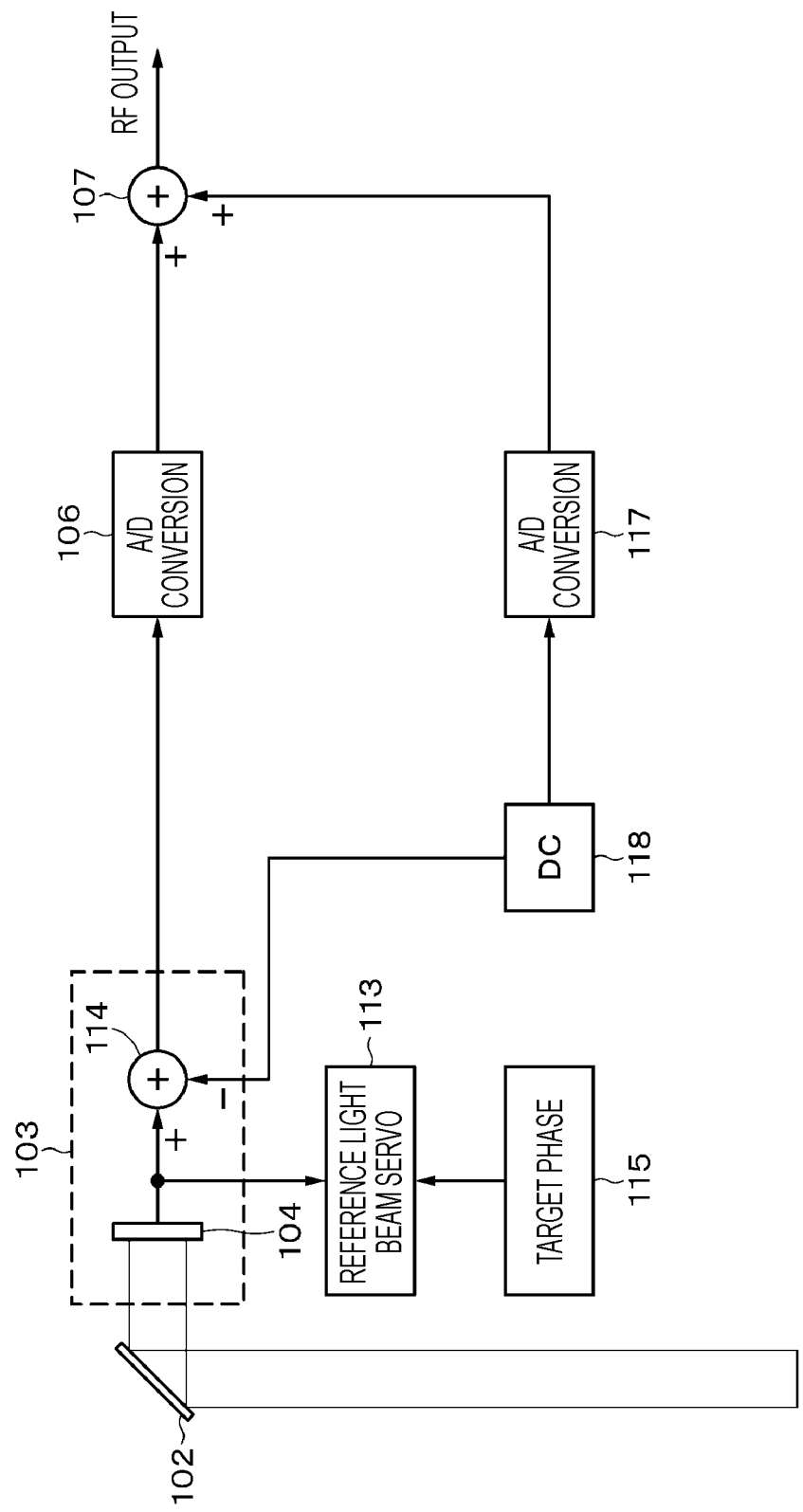
FIG. 21 is a block diagram of a sixth example of the photoelectric conversion circuit.

FIG. 21 illustrates a sixth example of the photoelectric conversion circuit. In this example, as in the fifth example, there is no need to divide the optical path, and the reference light beam servo 113 is provided. A DC value 118 is supplied to the subtractor 114 of the photoelectric conversion circuit 103. The output of the subtractor 114 is converted into a digital signal by the A/D converter 106, and supplied to the adder 107. A value obtained by digitizing the DC value 118 by an A/D converter 117 is supplied to the adder 107. Note that in a case where the DC value is added by the adder 107, a level correction coefficient for the DC value may be multiplied.

Figure 22:
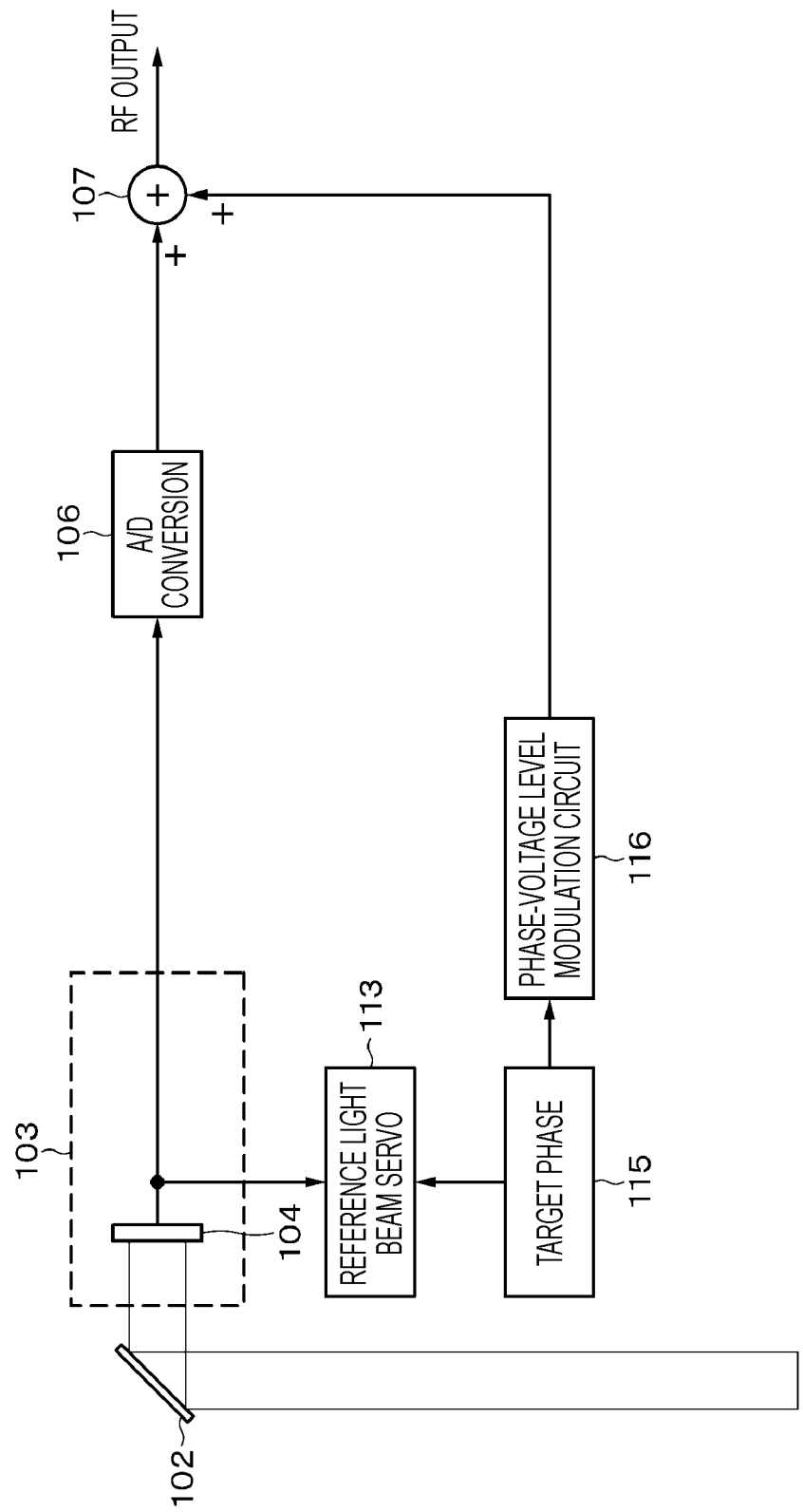
FIG. 22 is a block diagram of a seventh example of the photoelectric conversion circuit.

FIG. 22 illustrates a seventh example of the photoelectric conversion circuit. In this example, as in the fifth example, there is no need to divide the optical path, and the reference light beam servo 113 is provided. The target phase 115 given to the reference light beam servo 113 is supplied to the phase-voltage level conversion circuit 116. A voltage corresponding to the target phase is formed by the phase-voltage level conversion circuit 116, and this voltage is supplied to the adder 107. Note that in a case where the DC value is added by the adder 107, a level correction coefficient for the DC value may be multiplied.

5. Modified Example

The embodiments according to the present technology have been specifically described above. However, the present technology is not limited to the aforementioned respective embodiments and various modified examples based on the technological spirit of the present technology can be made. For example, the wavelength of the laser beam source may be other than 405 nm.

Moreover, the reproducing optical system is not limited to the configuration illustrated in FIG. 5, but for example, a homodyne detection optical system may be used to obtain four kinds of the light receiving signals I to L. The homodyne detection optical system has a Wollaston prism and is capable of generating light beams having respective phase differences of 0 degrees, 90 degrees, 180 degrees, and 270 degrees.

Furthermore, the configurations, methods, processes, shapes, materials, numerical values, and the like exemplified in the above-described embodiments can be mutually combined without departing from the spirit of the present technology.

Note that the present technology can also be configured as follows.

(1)
A reproducing apparatus including:
an optical system that irradiates a recording medium on which signals are each recorded on a land and a groove with a light beam emitted from a light source to obtain a signal light beam reflecting each of the recording signals of the land and the groove, generates a reference light beam from the light beam emitted from the light source, and generates a set of a first signal light beam and a first reference light beam which give a phase difference of approximately 0° to a superimposed light beam obtained by superimposing the signal light beam and the reference light beam, a set of a second signal light beam and a second reference light beam which give a phase difference of approximately 180° to the superimposed light beam, a set of a third signal light beam and a third reference light beam which give a phase difference of approximately 90° to the superimposed light beam, and a set of a fourth signal light beam and a fourth reference light beam which give a phase difference of approximately 270° to the superimposed light beam;
a light receiving unit that uses a first light receiving element to receive the set of the first light beam and the first reference light beam, a second light receiving element to receive the set of the second signal light beam and the second reference light beam, a third light receiving element to receive the set of the third signal light beam and the reference, and a fourth light receiving element to receive the set of the fourth signal light beam and the fourth reference light beam;
a reproduction signal generating circuit that calculates a first difference signal a which is a difference between a first light receiving signal obtained by the first light receiving element and a second light receiving signal obtained by the second light receiving element, and a second difference signal b which is a difference between a third light receiving signal obtained by the third light receiving element and a fourth light receiving signal obtained by the fourth light receiving element, and
uses the first difference signal a, the second difference signal b, a phase difference $\Psi$ between a crosstalk component and an average phase of the signal light beam, and an optical path length difference $\theta$ between the signal light beam and the reference light beam to carry out an arithmetic operation of $a \cdot \sin(\Psi - \theta(t)) - b \cdot \cos(\Psi - \theta(t))$ to obtain a reproduction signal; and a phase extraction circuit that obtains a successive change amount $\Delta\theta$ of $\theta$ and updates $\theta$ with the successive variation $\Delta\theta$.
(2)
The reproducing apparatus according to claim 1, in which a successive change amount $\Delta\theta t$ is obtained by a following expression when $\theta t+1 = \theta t + \Delta\theta t$.

[Expression 18]

$$\Delta\theta_t = \eta \cdot F\left(\frac{a_t \sin\theta_t + b_t \cos\theta_t}{b_t \sin\theta_t \, a_t \cos\theta_t}\right) \quad (3)$$

The reproducing apparatus according to (1) or (2), in which the reference light beam is generated by reflecting a light beam emitted from the light source by a mirror.
(4)
The reproducing apparatus according to any one of (1) to (3), in which the phase offset is assumed to be approximately equal to ($|\Psi| = 4\pi n d/\lambda$) (n is a refractive index, d is a step between the land and the groove, and $\lambda$ is a wavelength of a light beam).
(5)
The reproducing apparatus according to any one of (1) to (4), in which when a reproduction signal is formed from a light receiving signal output from a light receiving element, an optical path is divided into a first optical path and second optical path, a high frequency component is extracted from a light receiving signal on the first optical path, a low-frequency component is extracted from a light receiving signal on the second optical path, and
the high frequency component converted into a digital signal and the low frequency component converted into a digital signal are synthesized to obtain a reproduction signal.
(6)
The reproducing apparatus according to (5), further including a reference light beam servo that applies a reference light beam servo by a light receiving signal on the second optical path.
(7)
The reproducing apparatus according to any one of (1) to (4), in which when a reproduction signal is formed from a light receiving signal output from a light receiving element, an optical path is divided into a first optical path and second optical path, a high frequency component is extracted from a light receiving signal on the first optical path, a reference light beam servo is applied by the light receiving signal of the second optical path, and
the high frequency component converted into a digital signal and a fixed DC value are synthesized to obtain a reproduction signal.
(8)
The reproducing apparatus according to any one of (1) to (4), in which when a reproduction signal is formed from a light receiving signal output from a light receiving element, an optical path is divided into a first optical path and second optical path, a fixed DC value is subtracted from a light receiving signal on the first optical path, a reference light beam servo is applied by the light receiving signal of the second optical path, and
a signal obtained by converting into a digital signal a signal in which the fixed DC value is subtracted and the fixed DC value are synthesized to obtain a reproduction signal.
(9)
The reproducing apparatus according to any one of (1) to (4), in which when a reproduction signal is formed from a light receiving signal output from a light receiving element, a reference light beam servo is applied by a light receiving signal of a single optical path,
a DC value corresponding to a target phase of the reference light beam servo is subtracted from the light receiving signal, and
a signal obtained by converting into a digital signal a signal in which the DC value is subtracted and a signal obtained by converting the DC value corresponding to the target phase into a digital signal are synthesized to obtain a reproduction signal.
(10)
The reproducing apparatus according to any one of (1) to (4), in which when a reproduction signal is formed from a light receiving element output from a light reception element, a reference light beam servo is applied by a light receiving signal of a single optical path,
a fixed DC value is subtracted from the light receiving signal, and a signal obtained by converting into a digital signal a signal in which the DC value is subtracted and a signal obtained by converting the fixed DC value into a digital signal are synthesized to obtain a reproduction signal.

(11)

The reproducing apparatus according to any one of (1) to (4), in which when a reproduction signal is formed from a light receiving signal output from a light receiving element, a reference light beam servo is applied by a light receiving signal of a single optical path, and a signal obtained by converting the light receiving signal into a digital signal and a signal obtained by converting a DC value corresponding to the target phase into a digital signal are synthesized to obtain a reproduction signal.

(12)

A reproducing method including:

irradiating a recording medium on which signals are each recorded on a land and a groove with a light beam emitted from a light source to obtain a signal light beam reflecting each of the recording signals of the land and the groove, generating a reference light beam from the light beam emitted from the light source, and generating, by an optical system, a set of a first signal light beam and a reference light beam which give a phase difference of approximately 0° to a superimposed light beam obtained by superimposing the signal light beam and the reference light beam, a set of a second signal light beam and a second reference light beam which give a phase difference of approximately 180° to the superimposed light beam, a set of a third signal light beam and a third reference light beam which give a phase difference of approximately 90° to the superimposed light beam, and a set of a fourth signal light beam and a fourth reference light beam which give a phase difference of approximately 270° to the superimposed light beam;

using a first light receiving element to receive the set of the first light beam and the first reference light beam, a second light receiving element to receive the set of the second signal light beam and the second reference light beam, a third light receiving element to receive the set of the third signal light beam and the third reference light beam, and a fourth light receiving element to receive the set of the fourth signal light beam and the reference light beam;

calculating a first difference signal a which is a difference between a first light receiving signal obtained by the first light receiving element and a second light receiving signal obtained by the second light receiving element, and a second difference signal b which is a difference between a third light receiving signal obtained by the third light receiving element and a fourth light receiving signal obtained by the fourth light receiving element, and using the first difference signal a, the second difference signal b, a phase difference $\Psi$ between a crosstalk component and an average phase of the signal light beam, and an optical path length difference $\theta$ between the signal light beam and the reference light beam to carry out an arithmetic operation of $a \cdot \sin(\Psi - \theta(t)) - b \cdot \cos(\Psi - 0(t))$ to obtain a reproduction signal; and obtaining a successive change amount $\Delta\theta$ of $\theta$ and updates $\theta$ with the successive variation $\Delta\theta$.

REFERENCE SIGNS LIST

1 Optical recording medium
41 Laser diode
44 Objective lens
71 Phase extraction circuit

The invention claimed is:

1. A reproducing apparatus comprising:

an optical system that irradiates a recording medium on which signals are each recorded on a land and a groove with a light beam emitted from a light source to obtain a signal light beam reflecting each of the recording signals of the land and the groove, generates a reference light beam from the light beam emitted from the light source, and generates a set of a first signal light beam and a reference light beam which give a phase difference of approximately 0° to a superimposed light beam obtained by superimposing the signal light beam and the reference light beam, a set of a second signal light beam and a second reference light beam which give a phase difference of approximately 180° to the superimposed light beam, a set of a third signal light beam and a third reference light beam which give a phase difference of approximately 90° to the superimposed light beam, and a set of a fourth signal light beam and a fourth reference light beam which give a phase difference of approximately 270° to the superimposed light beam;

a light receiving unit that uses a first light receiving element to receive the set of the first light beam and the first reference light beam, a second light receiving element to receive the set of the second signal light beam and the second reference light beam, a third light receiving element to receive the set of the third signal light beam and the reference, and a fourth light receiving element to receive the set of the fourth signal light beam and the fourth reference light beam;

a reproduction signal generating circuit that calculates a first difference signal a which is a difference between a first light receiving signal obtained by the first light receiving element and a second light receiving signal obtained by the second light receiving element, and a second difference signal b which is a difference between a third light receiving signal obtained by the third light receiving element and a fourth light receiving signal obtained by the fourth light receiving element, and uses the first difference signal a, the second difference signal b, a phase difference $\Psi$ between a crosstalk component and an average phase of the signal light beam, and an optical path length difference $\theta$ between the signal light beam and the reference light beam to carry out an arithmetic operation of $a \cdot \sin(\Psi - \theta(t)) - b \cdot \cos(\Psi - \theta(t))$ to obtain a reproduction signal; and a phase extraction circuit that obtains a successive change amount $\Delta\theta$ of $\theta$ and updates $\theta$ with the successive variation $\Delta\theta$.

2. The reproducing apparatus according to claim 1, wherein a successive change amount $\Delta\theta t$ is obtained by a following expression when $\theta t+1 = \theta t + \Delta\theta t$.

[Expression 18]

$$\Delta\theta_t = \eta \cdot F\left(\frac{a_t \sin\theta_t + b_t \cos\theta_t}{b_t \sin\theta_t \ a_t \cos\theta_t}\right)$$

3. The reproducing apparatus according to claim 1, wherein the reference light beam is generated by reflecting a light beam emitted from the light source by a mirror.

4. The reproducing apparatus according to claim 1, wherein the phase difference is assumed to be approximately equal to ($\Psi=4\pi nd/\lambda$) (n is a refractive index, d is a step between the land and the groove, and $\lambda$ is a wavelength of a light beam).

5. The reproducing apparatus according to claim 1, wherein when a reproduction signal is formed from a light receiving signal output from a light receiving element, an optical path is divided into a first optical path and second optical path, a high frequency component is extracted from a light receiving signal on the first optical path, a low-frequency component is extracted from a light receiving signal on the second optical path, and
    the high frequency component converted into a digital signal and the low frequency component converted into a digital signal are synthesized to obtain a reproduction signal.

6. The reproducing apparatus according to claim 5, further comprising a reference light beam servo that applies a reference light beam servo by a light receiving signal on the second optical path.

7. The reproducing apparatus according to claim 1, wherein when a reproduction signal is formed from a light receiving signal output from a light receiving element, an optical path is divided into a first optical path and second optical path, a high frequency component is extracted from a light receiving signal on the first optical path, a reference light beam servo is applied by the light receiving signal of the second optical path, and
    the high frequency component converted into a digital signal and a fixed DC value are synthesized to obtain a reproduction signal.

8. The reproducing apparatus according to claim 1, wherein when a reproduction signal is formed from a light receiving signal output from a light receiving element, an optical path is divided into a first optical path and second optical path, a fixed DC value is subtracted from a light receiving signal on the first optical path, a reference light beam servo is applied by the light receiving signal of the second optical path, and
    a signal obtained by converting into a digital signal a signal in which the fixed DC value is subtracted and the fixed DC value are synthesized to obtain a reproduction signal.

9. The reproducing apparatus according to claim 1, wherein when a reproduction signal is formed from a light receiving signal output from a light receiving element, a reference light beam servo is applied by a light receiving signal of a single optical path,
    a DC value corresponding to a target phase of the reference light beam servo is subtracted from the light receiving signal, and
    a signal obtained by converting into a digital signal a signal in which the DC value is subtracted and a signal obtained by converting the DC value corresponding to the target phase into a digital signal are synthesized to obtain a reproduction signal.

10. The reproducing apparatus according to claim 1, wherein when a reproduction signal is formed from a light receiving element output from a light reception element, a reference light beam servo is applied by a light receiving signal of a single optical path,
    a fixed DC value is subtracted from the light receiving signal, and
    a signal obtained by converting into a digital signal a signal in which the DC value is subtracted and a signal obtained by converting the fixed DC value into a digital signal are synthesized to obtain a reproduction signal.

11. The reproducing apparatus according to claim 1, wherein when a reproduction signal is formed from a light receiving signal output from a light receiving element, a reference light beam servo is applied by a light receiving signal of a single optical path, and
    a signal obtained by converting the light receiving signal into a digital signal and a signal obtained by converting a DC value corresponding to the target phase into a digital signal are synthesized to obtain a reproduction signal.

12. A reproducing method comprising:
irradiating a recording medium on which signals are each recorded on a land and a groove with a light beam emitted from a light source to obtain a signal light beam reflecting each of the recording signals of the land and the groove, generating a reference light beam from the light beam emitted from the light source, and generating, by an optical system, a set of a first signal light beam and a first reference light beam which give a phase difference of approximately 0° to a superimposed light beam obtained by superimposing the signal light beam and the reference light beam, a set of a second signal light beam and a reference light beam which give a phase difference of approximately 180° to the superimposed light beam, a set of a third signal light beam and a third reference light beam which give a phase difference of approximately 90° to the superimposed light beam, and a set of a fourth signal light beam and a fourth reference light beam which give a phase difference of approximately 270° to the superimposed light beam;
using a first light receiving element to receive the set of the first light beam and the first reference light beam, a second light receiving element to receive the set of the second signal light beam and the second reference light beam, a third light receiving element to receive the set of the third signal light beam and the third reference light beam, and a fourth light receiving element to receive the set of the fourth signal light beam and the fourth reference light beam;
calculating a first difference signal a which is a difference between a first light receiving signal obtained by the first light receiving element and a second light receiving signal obtained by the second light receiving element, and a second difference signal b which is a difference between a third light receiving signal obtained by the third light receiving element and a fourth light receiving signal obtained by the fourth light receiving element, and
using the first difference signal a, the second difference signal b, a phase difference $\Psi$ between a crosstalk component and an average phase of the signal light beam, and an optical path length difference $\theta$ between the signal light beam and the reference light beam to carry out an arithmetic operation of $a\cdot\sin(\Psi-\theta(t))-b\cdot\cos(\Psi-\theta(t))$ to obtain a reproduction signal; and
obtaining a successive change amount $\Delta\theta$ of $\theta$ and updates $\theta$ with the successive variation $\Delta\theta$.

* * * * *